(12) United States Patent
Roth

(10) Patent No.: US 6,847,387 B2
(45) Date of Patent: *Jan. 25, 2005

(54) MENU MANAGEMENT MECHANISM THAT DISPLAYS MENU ITEMS BASED ON MULTIPLE HEURISTIC FACTORS

(75) Inventor: Steven William Roth, Rochester, MN (US)

(73) Assignee: International Business Machines Corporation, NY (US)

(*) Notice: Subject to any disclaimer, the term of this patent is extended or adjusted under 35 U.S.C. 154(b) by 629 days.

This patent is subject to a terminal disclaimer.

(21) Appl. No.: 09/817,692

(22) Filed: Mar. 26, 2001

(65) Prior Publication Data

US 2001/0019338 A1 Sep. 6, 2001

Related U.S. Application Data

(62) Division of application No. 09/121,391, filed on Jul. 23, 1998, now Pat. No. 6,266,060, which is a division of application No. 08/784,670, filed on Jan. 21, 1997, now Pat. No. 6,583,797.

(51) Int. Cl.$^7$ .................................................. G06F 3/14
(52) U.S. Cl. ...................... 345/811; 345/812; 345/825; 345/813; 345/738
(58) Field of Search ................................ 345/738, 739, 345/825, 811, 812, 813, 841, 853, 854; 707/501.1; 709/201

(56) References Cited

U.S. PATENT DOCUMENTS

| | | | |
|---|---|---|---|
| 4,862,498 A | * 8/1989 | Reed | 707/1 |
| 4,890,257 A | 12/1989 | Anthias et al. | 364/900 |
| 4,896,148 A | 1/1990 | Kurita | 340/731 |
| 5,001,697 A | 3/1991 | Torres | 364/521 |
| 5,179,653 A | 1/1993 | Fuller | 395/156 |
| 5,208,910 A | 5/1993 | Higgins et al. | 395/156 |
| 5,243,697 A | 9/1993 | Hoeber et al. | 395/156 |
| 5,263,174 A | 11/1993 | Layman | 395/800 |
| 5,420,975 A | 5/1995 | Blades et al. | 395/156 |
| 5,535,321 A | 7/1996 | Massaro et al. | 395/153 |
| 5,625,781 A | 4/1997 | Cline et al. | 345/335 |
| 5,727,129 A | * 3/1998 | Barrett et al. | 706/10 |
| 5,742,768 A | * 4/1998 | Gennaro et al. | 709/201 |
| 5,864,863 A | 1/1999 | Burrows | 707/103 |
| 5,870,559 A | 2/1999 | Leshem | 709/224 |
| 6,052,676 A | 4/2000 | Hekmatpour | 706/11 |
| 6,160,552 A | * 12/2000 | Wilsher et al. | 345/339 |

OTHER PUBLICATIONS

Mark R. Brown, Netscape 3, Que, pp. 94–109 and 313–315).*

(List continued on next page.)

*Primary Examiner*—Steven Sax
*Assistant Examiner*—Thomas T Nguyen
(74) *Attorney, Agent, or Firm*—Steven W. Roth

(57) ABSTRACT

The mechanisms of the present invention provide comprehensive heuristic menu arrangement control by providing several discrete, yet complementary, features. One feature is automatic menu arrangement for both fixed and variable content menus based on a combination of frequency of selection and recency of selection. Another feature is the consideration of time of day for menu arrangement. Time of day is used in two different ways. First, time of day is used as a heuristic factor (i.e., in the same way as recency and frequency) to affect the automatic arrangement of menu items. The second time of day feature allows the user to affect the order that certain menu items are presented during a user specified time period.

17 Claims, 31 Drawing Sheets

OTHER PUBLICATIONS

IBM Technical Disclosure Bulletin, vol. 37, No. 09, Becker et al., Sep. 1994, "Previous Button and Tab–Extensions for Accessing Hidden Windows," pp. 471–474.

Text of IBM Research Disclosure, No. 289, Conner et al., May 1988, "A Multi–Pick Selection of Algorithm and Cursor Handling Method".

IBM Technical Disclosure Bulletin, No. 9, Redpath, Feb. 1991, "Multi–Presentation List Control," pp. 413–414.

IBM Technical Disclosure Bulletin, Weathers, May 1986, "Interactive Information Retrieval System: Moving Icon Selection," pp. 5399–5401.

IBM Technical Disclosure Bulletin, Weathers, May 1986, "Interactive Information Retrieval System: Sub–Icon Selection," pp. 5395–5396.

Abstract for U.S. Appl. No. 5,450,570, "Computer Implemented Method and Apparatus for Dynamic Configuration of a Computer System and Circuit Boards Including Computer Resource Allocation Conflict Resolution".

Abstract for U.S. Appl. No. 5,353,432, "Interactive Method for Configuration of Computer System and Circuit Boards with User Specification of System Resources and Computer Resolution of Resource Conflicts".

Abstract for U.S. Appl. No. 5,257,387, "Computer Implemented Method and Apparatus for Dynamic and Automatic Configuration of a Computer System and Circuit Boards Including Computer Resource Allocation Conflict Resolution".

Abstract for U.S. Appl. No. 5,203,705, "Word Spelling and Definition Educational Device".

Abstract for U.S. Appl. No. 5,446,891, "System for Adjusting Hypertext Links with Weighed User Goals and Activities".

Abstract for U.S. Appl. No. 5,241,688, "Method and Apparatus for Dynamic and Interdependent Processing of Inbound Calls and Outbound Calls".

Abstract for Japanese Patent No. JP 06–28194, Feb. 2, 1994, "External Reference System".

Abstract for Japanese Patent No. JP 05–252460, Sep. 28, 1993, "Display Time Selecting Device for In–Screen Display Information".

Abstract for Japanese Patent No. JP 04–351777, Dec. 7, 1992, "Automatic Music Selection Method for Optional Disk Reproducing Device".

Abstract for Japanese Patent No. JP 04–298103, Oct. 21, 1992, "Oscillation Circuit".

Abstract for Japanese Patent No. JP 04–294617, Oct. 19, 1992, "Oscillation Circuit".

Abstract for Japanese Patent No. JP 04–158115, Jun. 1, 1992, "Microwave Oven".

Abstract for Japanese Patent No. JP 04–157991, May 29, 1992, "Television Receiver".

Abstract for Japanese Patent No. JP 04–157900, May 29, 1992, "Televison Receiver".

Abstract for Japanese Patent No. JP 04–10153, Jan. 14, 1992, "Information Retrieval System".

Abstract for Japanese Patent No. JP 03–224527, Oct. 3, 1991, "Hot–Water Supply Device".

Abstract for Japanese Patent No. JP 03–95667, Apr. 22, 1991, "Document Processor".

Abstract for Japanese Patent No. JP 03–22084, Jan. 30, 1991, "Information Retrieval System".

Abstract for Japanese Patent No. JP 01–262595, Oct. 19, 1989, "Code Proceeding Generating Device".

Abstract for Japanese Patent No. JP 01–137405 May 30, 1989, "Recording System for Rotary Head Type Tape Recorder".

Abstract for Japanese Patent No. JP 63–183662 Jul. 29, 1988, "Video Signal Recording and Reproducing Device".

Abstract for Japanese Patent No. JP 62–239763, Oct. 20, 1987, "Facsimile Equipment".

IBM Technical Disclosure Bulletin, vol. 37, No. 03, Salahshour et al., Mar. 1994, "Methodology for Dynamic Menu Escalation Selection for Pull–Down Menu," pp. 127–128.

Abstract for Japanese Patent No. JP 53–79213 Jul. 13, 1978, "Control Device of Motor".

Abstract for WIPO Patent No. WO9420921, Sep. 15, 1994, "Tracked Pop–Up Menu Computer Display for Producing Multi–Media Slide Presentation".

Abstract for Patent No. CA2083720, May 17, 1994, "Diskette Holder for 5 1/4", 3 1/2" or Any Other Size, Shape, or Form of Diskette".

Abstract for Patent No. EP–576030, Dec. 29, 1993, "Portable Computer with Modifiable Menu Icons on Screen".

Abstract for Patent No. GB2232290, Dec. 5, 1990, "Selection Appts. for Juice Box".

Abstract for U.S. Appl. No. 4,757,519, Jul. 12, 1988, "Programmable Digital Modulation Filter for RF Transmitter Using FM".

Abstract for Japanese Patent No. JP07174344, Jul. 14, 1995, "Microwave Oven".

Abstract for Patent No. DE4344338, Jun. 29, 1995, "Video Recorder Controller Displaying Menu".

Abstract for U.S. Appl. No. 5,367,315, Nov. 11, 1994, "Computer System Cursor Controlling".

Abstract for Patent No. WO9406221, Mar. 17, 1994, "Position Confirmation System of Moving Body Using Radio Wave".

Abstract for Patent No. EP–576030, Dec. 29, 1993, "Portable Computer with Modifiable Menu Icons on Screen".

Abstract for Patent No. RD–345023, Jan. 10, 1993, "Length– Adjustable Action Entry Fields for Processing Lists of Objects".

Abstract for Patent No. RD–328029, Aug. 10, 1991, "Automated Progressive Learning and Instruction of System Capabilities".

Abstract for Patent No. RD–327033, Jul. 10, 1991, "Customisation Method for Graphical Interfaces".

Abstract for Patent No. EP–386836, Sep. 12, 1990, "Program Identification System for Mobile Communications".

Abstract for Patent No. WO8902641, Mar. 23, 1989, "Self–Contained Polyphonic Programmable Sequencer for Music Teaching".

Abstract for U.S. Appl. No. 4,979,206, Dec. 18, 1990, "Automatic Processing of Directory Enquiry Calls".

Abstract for U.S. Appl. No. 4,817,101, Mar. 1989, "Laser Isotope Separation Spectroscopy System".

Abstract for U.S. Appl. No. EP–140593, May 8, 1985, "Juke–Box Type Music Delivery Method".

Abstract for U.S. Appl. No. 4,508,002, Apr. 2, 1985, "Melody Enhancing Appts. for Electrical Instrument".

Abstract for U.S. Appl. No. 4,340,800, Jul. 20, 1982, "Electric or Microwave Oven with Voice–Recognition Control System".

Abstract for U.S. Appl. No. 4,055,348, Oct. 25, 1977, "Word Building Game Appts".

Abstract for Patent No. FR2227689, Dec. 27, 1974, "Private Listening System".

Abstract for U.S. Appl. No. SU–744934, Jul. 5, 1980, "Digital Frequency Synthesiser".
Inspec Abstract No. C9411–6140D–016, Bing Liu et al., 1993, "Controlling Backtracking in a Constraint Programming Language".
Inspec Abstract No. B9304–6210K–001, MacGregor, 1992, "A Comparison of the Effects of Icons and Descriptors in Videotex Menu Retrieval".
Inspec Abstract No. C91032246, Janus, 1990, "HUM–A Concordance and Text Analysis Package for Unix".
Inspec Abstract No. C90067182, Gammill, 1989, "Buying a Computer: A Guided Tour".
Inspec Abstract No. C90070064, Frey et al., 1990, "Eye–Gaze Word Processing".
Inspec Abstract No. B90039508, Clarke, 1990, "The Ten–Tec OMNI–V (HF Transceiver)".
Inspec Abstract No. C89023911, Ljung et al., 1987, "On the Estimation of Transfer Functions".
Inspec Abstract No. C88024672, Shammas, 1988, "dBASE Mac vs. McMax".
Inspec Abstract No. A88020150, Sinaptec, 1987, "US Transducers: An Optimisation for CAD".
Inspec Abstract No. C87071135, Finch et al., 1987, "Data Capture for Fourier Analysis".
Inspec Abstract No. B86055037, Adama et al., 1986, "Design Tables for Partial–Response Data Transmission Filters".
Inspec Abstract No. B86023965, Meier, et al., 1985, "IC Techniques Slice Cost of Integrated Receiver".
Inspec Abstract No. C85023745, Hubacher, 1984, "FUTURE–System of the Future? (FX–30 Microcomputer)".
Inspec Abstract No. C85021545, Hativa, 1984, "Designing Flexible Software for the 'Electronic Board'".
Inspec Abstract No. C84047372, Carrier et al., 1984, "Selection of Options by Field Independent and Dependent Children In a Computer–Based Concept Lession".
Inspec Abstract No. B82032011, 1981, "Business Communication Users Can Get Best of Both Worlds".
Inspec Abstract No. A81049509, Thompson et al., 1980, "The Very Large Array".
Inspec Abstract No. B80010515, Kozicki, "Electromagnetic Compatibility Analysis Program (EMCAP). An Automated Frequency Management Tool for EMC Between Surface Missile Systems".
Inspec Abstract No. B78047384, Grote et al., 1977, "Advanced Digital Signal Analyzer Probes Low–Frequency Signals With Ease and Precision".

Inspec Abstract No. B78030718, Ely, 1978, "Frequency Measurements by Frequency Meter or Timer Counter?".
Inspec Abstract No. C78004268, Gitt et al., 1977, "Digital Simulation of Continuous Systems With and Without Parameter Optimization".
Inspec Abstract No. C7208034, Fallside et al., 1972, "Interactive Graphics Technique for the Design of Single–Input Feedback Systems".
Inspec Abstract No. C696586, Weiss et al., "Systran (Systems Analysis Translator): A Digital Computer Program".
Abstract for "Hierarchical Storage Management," D. Strom, InfoWorld, vol. 17, No. 17, p. 82, Apr. 24, 1995.
Abstract for "Aldus PhotoStyler: More than Retouched for Version 2.0," L Simone, PC Magazine, vol. 13, No. 3, p. 44, Feb. 8, 1994.
Abstract for "McIntosh Utilities," S. Jurist, Library Software Review, vol. 12, No. 2, p. 83, Summer 1993.
Abstract for "Noncommand User Interfaces (Future User Interfaces) GUIs: The Next Generation)," J Nielsen, Communications of the ACM, vol. 36, No. 4, p. 82, Apr. 1993.
Abstract for "New for PC: Battery Watch Now Supports Windows," J. Mallory, Newsbytes (Product Announcement), Feb. 24, 1992).
Abstract for "Utilities for Faster File Selection," L.E. Becker, Jr., MacWeek, vol. 4, No. 14, p. 124, Apr. 10, 1990.
Abstract for "Now Utilities 6.0," E Taub, MacUser, vol. 12, No. 7, p. 44, Jul. 1996.
Abstract for "Desktop Clutter Gets Easier in System 7.5," H. Norr, MacWEEK, vol. 8, No. 37, p. 24, Sep. 19, 1994.
Abstract for "Utilities/Title and Disk Management," MacUser, vol. 8, No. 13, p. 290, Annual 1993.
Abstract for "Paradox for Windows: the First Heavy–Duty DOS Data Manager to Go Graphical, Paradox for Windows Promises to Take the Pain out of Data Management," C Robinson, PC World, vol. 10, No. 8, p. 187, Aug. 1992.
Abstract for "The Case Against User Interface Consistency," J Grudin, Communications of the ACM, vol. 21, No. 10, p. 1164, Oct. 1989.
Abstract for "Now Utilities 2.0 Now Available," MacWEEK, vol. 4, No. 36, p. 15, Oct. 23, 1990.
Abstract for "Boomerang Added to Now Utilities," MacWEEK, vol. 4, No. 30, p. 32, Sep. 11, 1990.
Mark R. Brown, "Using NetScape 3.0 Special Edition," QUE, Chapter 2, 4; 1998.

* cited by examiner

WebExplorer Initialization

Master Profile

FIG. 8

| Name | Number |
|---|---|
| File | 1 |
| Options | 2 |
| Configure | 3 |
| Navigate | 4 |
| QuickList | 5 |
| Help | 6 |

Menu Adjuster 255

Menu Adjuster 255

Menu Adjuster 255 - Automatic Ranking

Menu Adjuster 255 – Automatic Ranking

Menu Adjuster 255 - Automatic Font Size Cont.

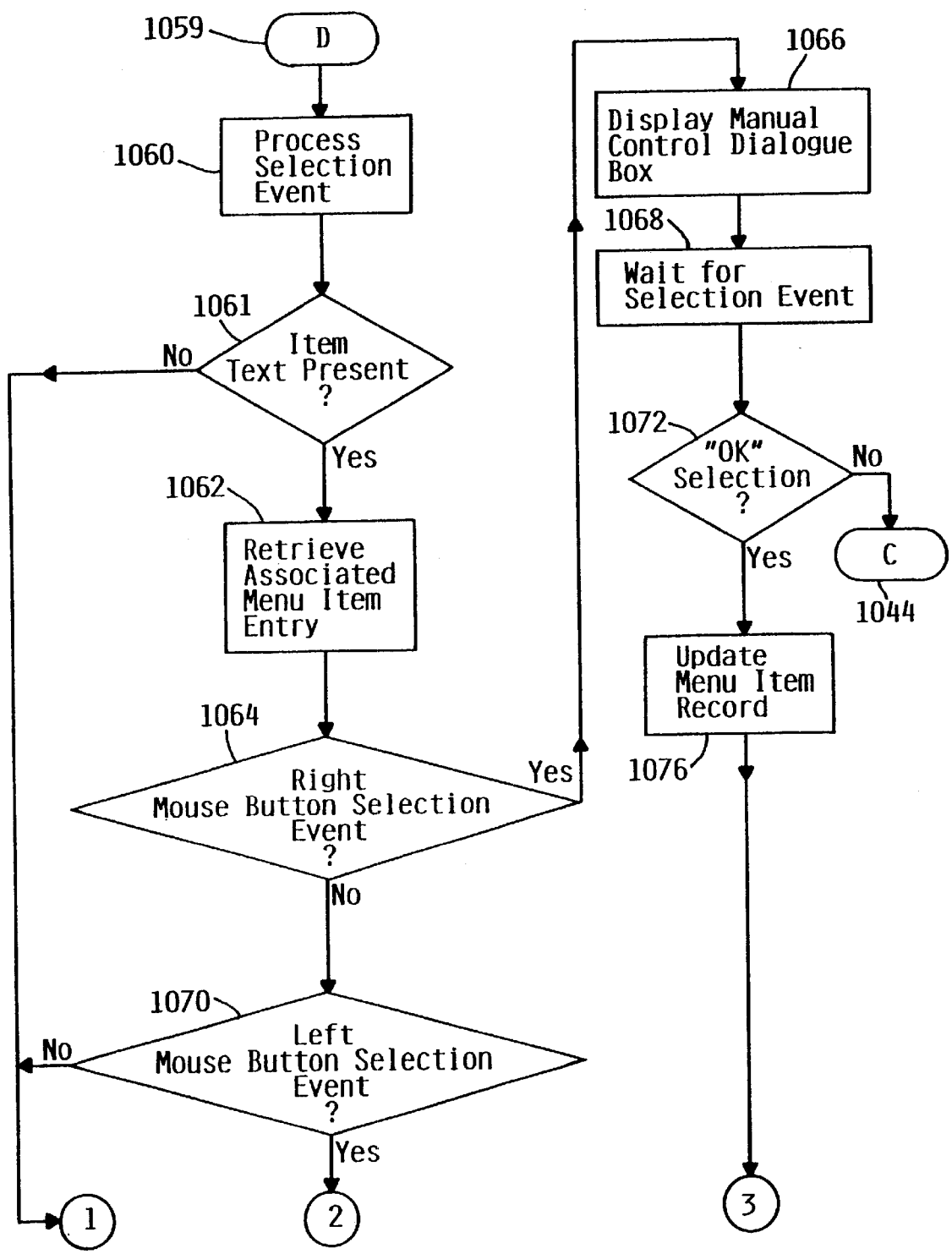
Menu Adjuster 255 - Item Selection
FIG. IOD-I

Menu Adjuster 255 - Item Selection

Last Selection Time is: 7:05 AM
Current Time is 7:15 AM

| Item | R | UC | LS | RR |
|---|---|---|---|---|
| Local N... /1200 /1150 | 1 | 2.0 | 12(8) | 40 |
| IP &... | 2 | 11.0 | 6(1) | 620 |
| U.S. Patent... /1315 | 3 | 6.0 | 7(0) | 720 |
| Switch ... | 4 | 15.0 | 13(1) | 550 |
| Weather for R... | 5 | 3.0 | 9(1) | 510 |
| IBM Intell... 1320 | 6 | 17.0 | 11(3) | 490 |
| Weather for M... | 7 | 7.0 | 18(5) | 190 |
| MONEY... | 8 | 8.0 | 5(6) | 160 |
| Rochester... | 9 | 1.0 | 15(4) | 70 |
| Software... /1325 | 10 | 0.0 | 10(10) | 0 |

Example Menu Item Entry Data

FIG. 13A

Last Selection Time is: 7:15 AM
Current Time is 7:30 AM

| Item | R | UC | LS | RR |
|---|---|---|---|---|
| Local N... /1200 | 1 | 1.8 | 12(8) | 36 |
| IP &... /1150 | 2 | 10.8 | 6(1) | 616 |
| U.S. Patent... /1315 | 3 | 5.8 | 7(0) | 716 |
| Software... /1325 | 4 | 1.0 | 7.25(0) | 620 |
| Switch ... | 5 | 14.8 | 13(1) | 546 |
| Weather for R... | 6 | 2.8 | 9(1) | 506 |
| IBM Intell... 1320 | 7 | 16.8 | 11(3) | 486 |
| Weather for M... | 8 | 6.8 | 18(5) | 186 |
| MONEY... | 9 | 7.8 | 5(6) | 156 |
| Rochester... | 10 | 0.8 | 15(4) | 66 |

Example Menu Item Entry Data

FIG. 13B

Last Selection Time is: 7:30 AM
Current Time is 8:45 AM

| Item | R | UC | LS | RR |
|---|---|---|---|---|
| Local N... (1200) | 1 | 1.6 | 12(8) | 32 |
| IP &... (1150) | 2 | 10.6 | 6(1) | 412 |
| IBM Intell... (1320) | 3 | 17.8 | 7.5(0) | 956 |
| U.S. Patent ... (1315) | 4 | 5.6 | 7(0) | 712 |
| Software... | 5 | 0.8 | 7.25(0) | 616 |
| Switch ... (1325) | 6 | 14.6 | 13(1) | 542 |
| Weather for R... | 7 | 2.6 | 9(1) | 502 |
| Weather for M... | 8 | 6.6 | 18(5) | 182 |
| MONEY... | 9 | 7.6 | 5(6) | 152 |
| Rochester... | 10 | 0.6 | 15(4) | 62 |

Example Menu Item Entry Data

FIG. 13C

Last Selection Time is: 7:30 AM
Current Time is 9:15 AM

| Item | R | UC | LS | RR |
|---|---|---|---|---|
| IP &... ~1150 | 1 | 10.6 | 6(1) | 412 |
| IBM Intell... 1320 | 2 | 17.8 | 7.5(0) | 956 |
| Software... | 3 | .8 | 7.25(0) | 616 |
| Switch ... 1325 | 4 | 14.6 | 13(1) | 542 |
| U.S. Patent ... 1315 | 5 | 5.6 | 7(0) | 512 |
| Weather for R... | 6 | 2.6 | 9(1) | 502 |
| Weather for M... | 7 | 6.6 | 18(5) | 182 |
| MONEY... | 8 | 7.6 | 5(6) | 152 |
| Rochester... | 9 | .6 | 15(4) | 62 |
| Local N... 1200 | 10 | 1.6 | 12(8) | 32 |

Example Menu Item Entry Data

FIG. 13D

Profile Feedback Mechanism 265

User Profile Update Message

Menu Preference Record

“MENU MANAGEMENT MECHANISM THAT DISPLAYS MENU ITEMS BASED ON MULTIPLE HEURISTIC FACTORS

REFERENCE TO PARENT APPLICATION

This application is a divisional of U.S. Ser. No. 09/121,391, filed on Jul. 23, 1998 by Steven W. Roth, and entitled "Menu Management Mechanism that Displays Menu Items Based on Multiple Heuristic Factors," which is a divisional of U.S. Ser. No. 08/784,670, filed on Jan. 21, 1997 by Steven W. Roth, and entitled "Menu Management Mechanism that Displays Menu Items Based on Multiple Heuristic Factors," which is hereby incorporated by reference in its entirety.

FIELD OF THE INVENTION

The present invention relates to data processing systems. More particularly, the present invention relates to menu management mechanisms for user interface-based programs.

BACKGROUND OF THE INVENTION

The use and the popularity of computer systems have steadily increased since around the middle of the twentieth century. This trend has been fueled by many different advances in computer system technology (e.g., the invention of random access memory in the 1950s and the introduction of the personal computer in the 1980s). One of the more recent of these advances relates to what is called a graphical user interface.

A graphical user interface, which is sometimes referred to as a "GUI," is a type of computer system display format that allows computer system users to interact with a computer system by pointing to pictorial representations of programs (called icons), lists of items (called menus), and to individual representations of other computer system items such as files and commands. This invention pertains to the presentation of menus to computer system users via user interfaces such as GUIs. There are essentially two different types of menus. We use the phrase fixed content menu to describe those menus that have items that remain the same over time. We use the phrase variable content menu to describe those menus that have items that change over time.

The main problem with existing menu presentation mechanisms is that they limit user efficiency because they do not provide comprehensive heuristic control over the arrangement of menu items. Instead of taking experience into account, existing menu management mechanisms maintain a relatively rigid menu item arrangement, regardless of whether the particular arrangement makes sense in light of the historical selections that were made by the program's user. Fixed content menus are never rearranged, no matter how often a user selects certain items and/or ignores certain other items. On the other hand, variable content menus change only in strict sequence with the order of past user selections such that only a certain number of the most recent selections appear on the menu.

One improvement in the menu management field, at least with respect to fixed content menus, is the menu management mechanism described in U.S. Pat. No. 5,420,975, which issued to Blades et al., and has been assigned to International Business Machines Corporation. This menu management mechanism tracks the number of times (i.e., the frequency) that menu item is selected, and changes the relative appearance of each item (through highlighting or deletion) based on how each item's frequency of selection compares with the other items in the menu. While the Blades mechanism does not change the actual order in which menu items are presented to the user, the mechanism does cause those items having a higher frequency of selection to be displayed more prominently.

While the Blades mechanism handles fixed content menus better than other prior art mechanisms, there is still further need for improvement. For example, there is still a need in the art for a mechanism that considers multiple heuristic factors for menu management. That is, there is still a need in the art for a mechanism that considers more that just recency, as is the case with prior art variable content menu management mechanisms; and more than just frequency, as is the case in the fixed content menu management mechanism of Blades.

Another need for improvement pertains to user control. Existing menu management mechanisms do not allow a user to choose which heuristic factors are considered or to tailor menus by instructing the menu management mechanism to maintain a certain menu item order within a given menu.

Without an improved menu management mechanism that provides comprehensive heuristic control and user control over the arrangement of menu items, users will continue to suffer from the inefficiencies of today's menu management mechanisms.

SUMMARY OF THE INVENTION

The mechanisms of the present invention provide comprehensive menu arrangement control by providing several discrete, yet complementary, features. One feature is the automatic ranking control feature, which provides for automatic heuristic control over menu item arrangement for both fixed and variable content menus. The automatic ranking control feature of the present invention uses one or more heuristic factors to automatically control the order in which menu item are arranged on a given menu. This feature is significant because it allows the menu management mechanism of the present invention to adapt quickly as use patterns change, while still taking historical selection patterns into account. (We use the phrase heuristic factor to generically describe information about past use. Examples of heuristic factors include: frequency of selection, recency of selection, and time of day of selection.)

A second feature relates the manual menu item control. The manual control facility of the present invention allows the user to manually rank individual menu items and to manually specify a time of day during which individual menu items are to appear at or near the top of the a given menu.

A third feature of the present invention relates to automatic font size control. The automatic font size control facility of the present invention allows the user to specify a minimum font size for variable content menus. This minimum font size is then used to maximize the number of menu items that can appear in variable content menus.

A fourth feature of the present invention relates to menu initialization. The teachings of the present invention include a client-server environment wherein historical menu item arrangement information is kept and periodically updated for different types of users. The historical menu item arrangement information is then used to initialize or reset a user's menus upon request.

A fifth feature of the present invention relates to web browser initialization. This feature, which is referred to herein as the smart load facility, allows the web browser user to choose to have the web browser automatically load a selected home-base web page after initialization (as is seen in prior art web browsers) or to have the web browser automatically load the web page that appears at the top of a Uniform Resource Locator (URL) list (i.e., a QuickList in IBM WebExplorer terminology or a Book Mark list in Netscape Navigator terminology).

These and other features of the present invention are described in the following pages with reference to the below-listed drawings.

BRIEF DESCRIPTION OF THE DRAWINGS

FIG. 8 is a block diagram of the menu item entry of the preferred embodiment.

FIG. 9 is a block diagram of the menu name/number mapping structure of the preferred embodiment.

FIGS. 13A through 13D are used as aids in the explanation of how the manual control facilities and the automatic control facilities of the preferred embodiment interrelate to provide comprehensive menu item arrangement to the user.

DESCRIPTION OF THE PREFERRED EMBODIMENT

Figure 1:
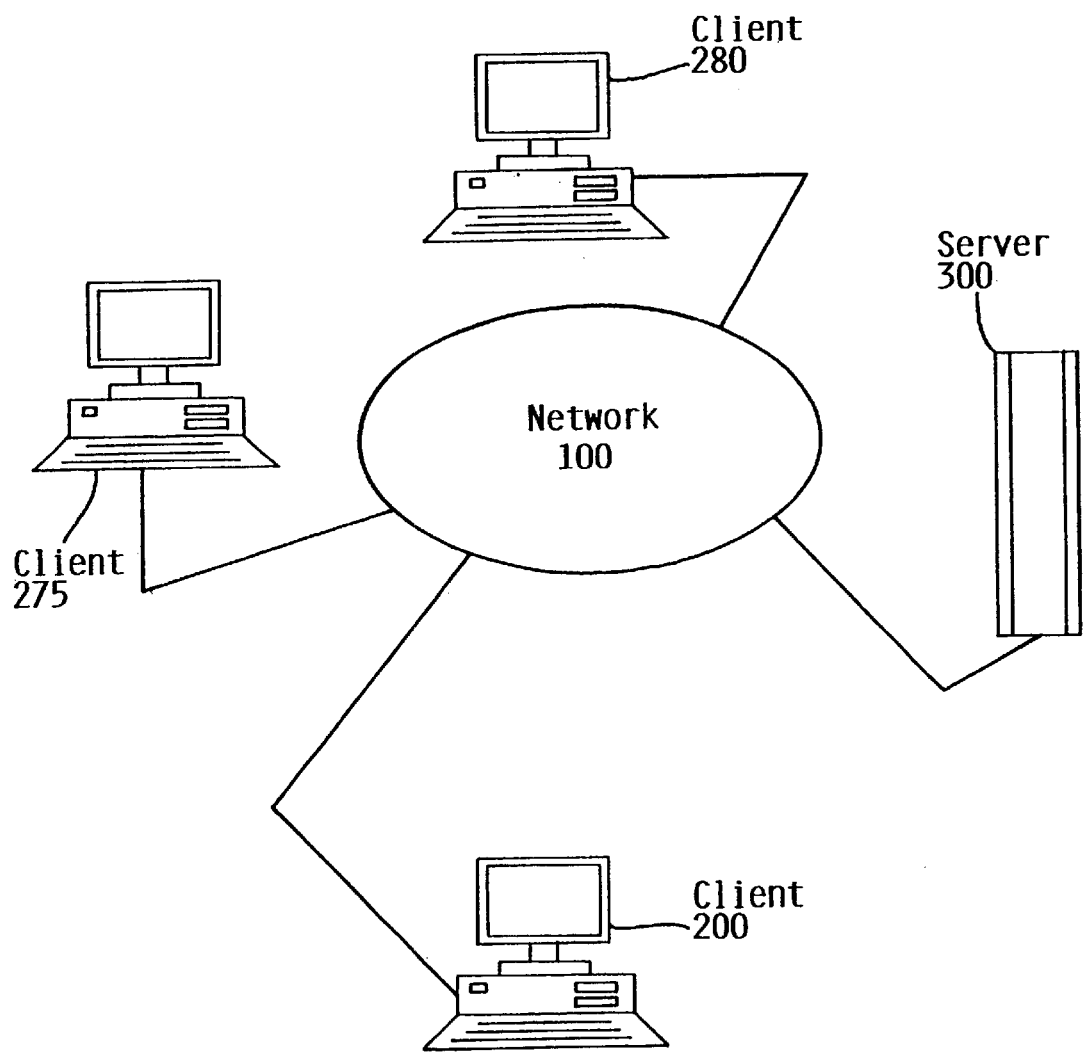
FIG. 1 is a block diagram of the network that is used in the preferred embodiment of the present invention.
Figure 2A:
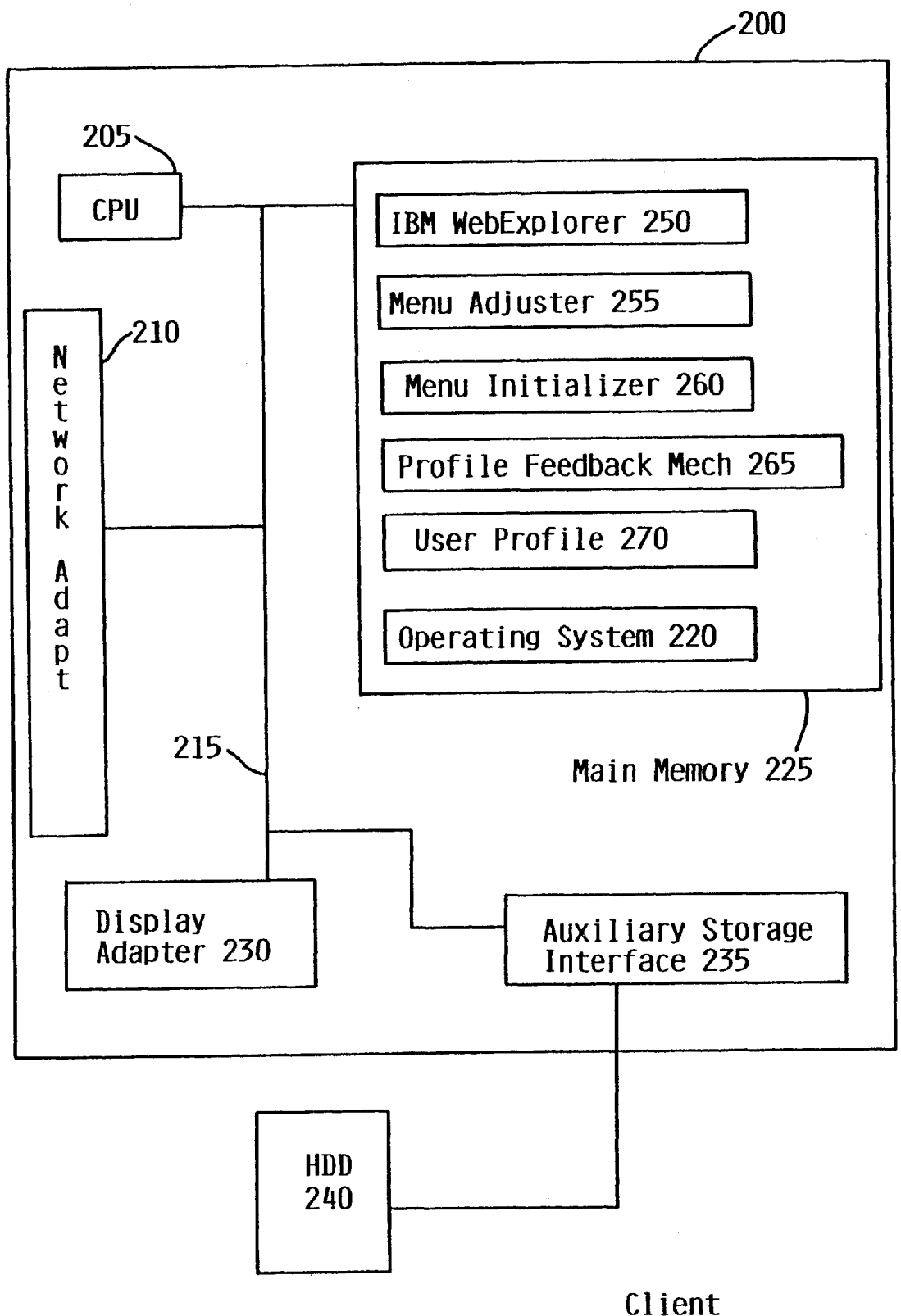
FIG. 2A is a block diagram of the client computer system that is used in the preferred embodiment of the present invention.

Turning now to the drawings, FIG. 1 shows a diagram of network 100, which is the network used in the preferred embodiment of the present invention. Network 100 is comprised of a single server, server computer 300, and several client workstations (i.e., clients 200, 275, and 280). However, those skilled in the art will appreciate that the present invention could well be practiced on a single workstation and that the present invention is not limited to use to any one network configuration. It should also be noted that the ensuing explanation uses a web browser (shown as WebExplorer 250 on FIG. 2A) as the program that has been enhanced to incorporate the menu management mechanism of the present invention. Of course, use of a web browser implies connection to, and use of, a network. Here, though, network 100 is included in the following description to explain certain client-server aspects of the menu management mechanism of the preferred embodiment, not for an explanation of the interaction between web browsers and networks FIG. 2A is a block diagram of the client computer system of the preferred embodiment. Client 200 is an enhanced IBM Personal Computer 350 P100; however, client 200 could also be a network computer connected to a server computer system (i.e., such as server 300), or some other type of computer system. As shown, client 200 comprises main or central processing unit (CPU) 205, which is connected to main memory 225, display adapter 230, auxiliary storage adapter 235, and network adapter 210. These system components are interconnected through the use of system bus 215. It should be understood, however, that the present invention could be practiced using some other type of a processor such as a co-processor or an auxiliary processor.

Auxiliary storage adapter 235 is used to connect mass storage devices (such as Hard Disk Drive 240) to client 200. Though not shown, client 200 is also equipped with a pointing device (mouse) that allows its user to make selections and to otherwise move about the GUI interfaces presented by operating system 220 and the other programs that execute on CPU 205 of client 200.

As shown, main memory 225 contains IBM WebExplorer 250, menu adjuster 255, menu initializer 260, profile feedback mechanism 265, user profile 270, and operating system 220. WebExplorer 250 is the computer program of the preferred embodiment that has been enhanced to include the menu management mechanisms of the present invention.

Figure 4A:
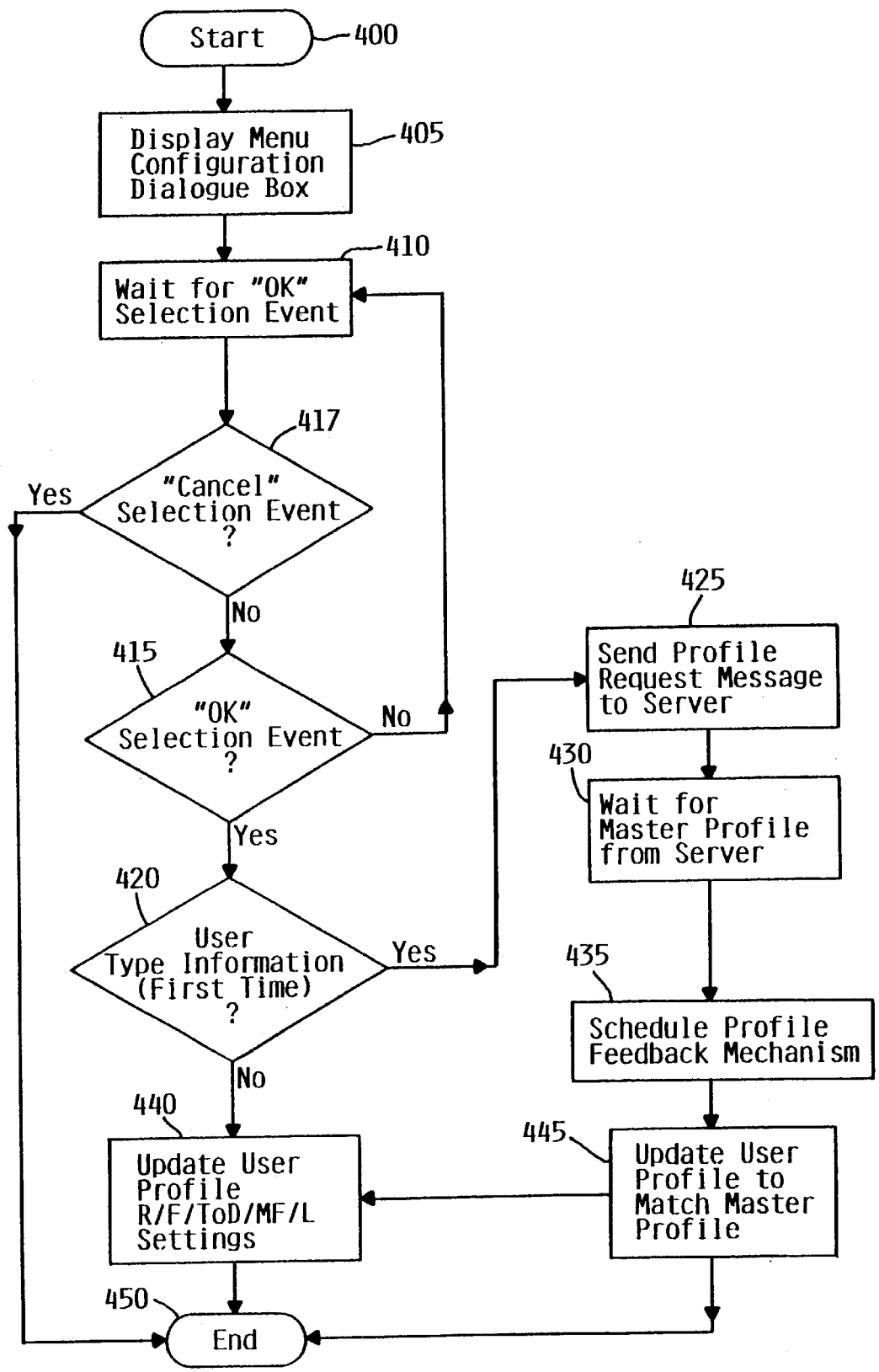
FIG. 4A is a diagram that shows the steps used in the preferred embodiment to carry out the processing of the menu initializer of the preferred embodiment.
Figure 6:
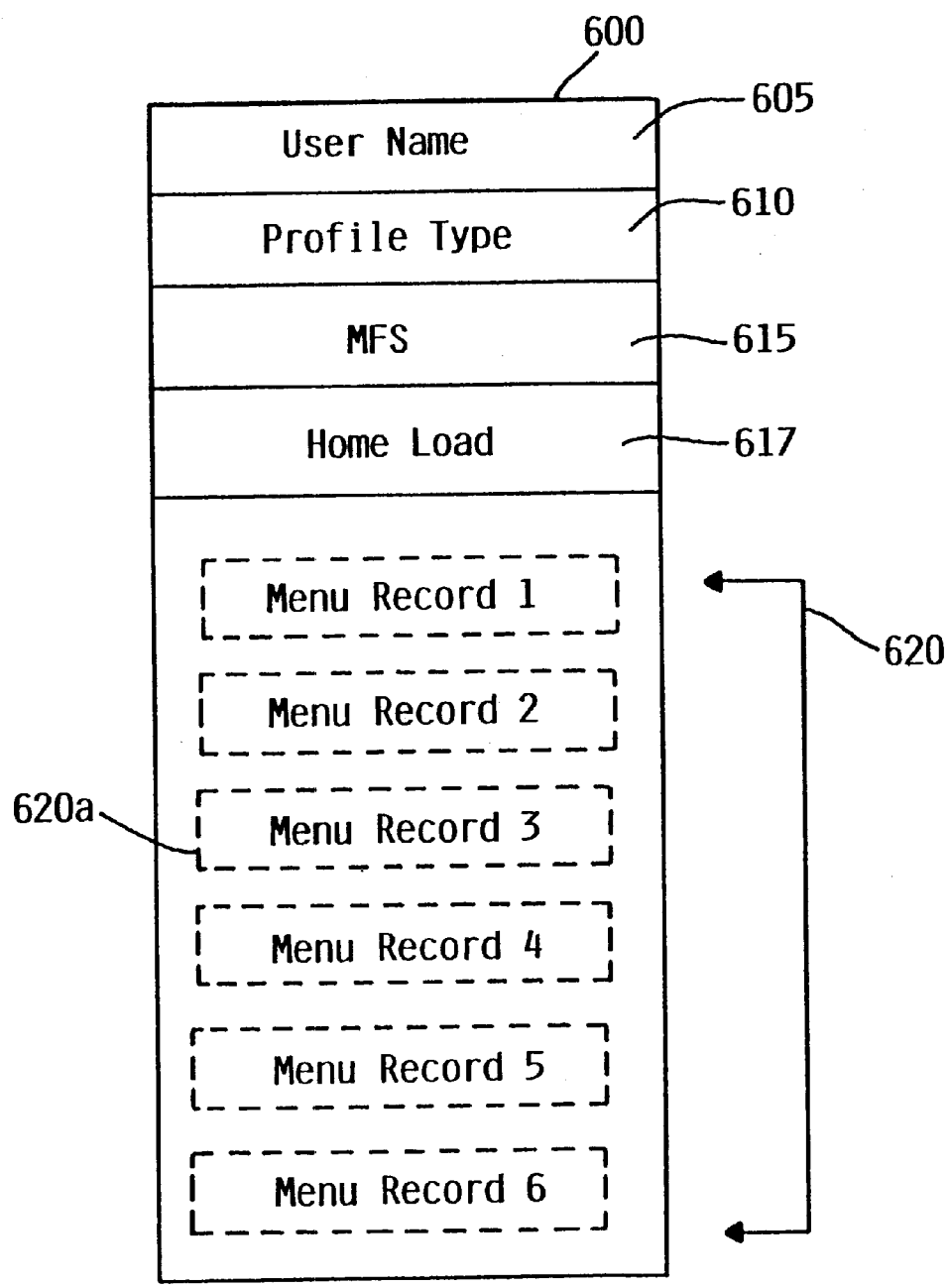
FIG. 6 is a block diagram of the user profile of the preferred embodiment.
Figure 7:
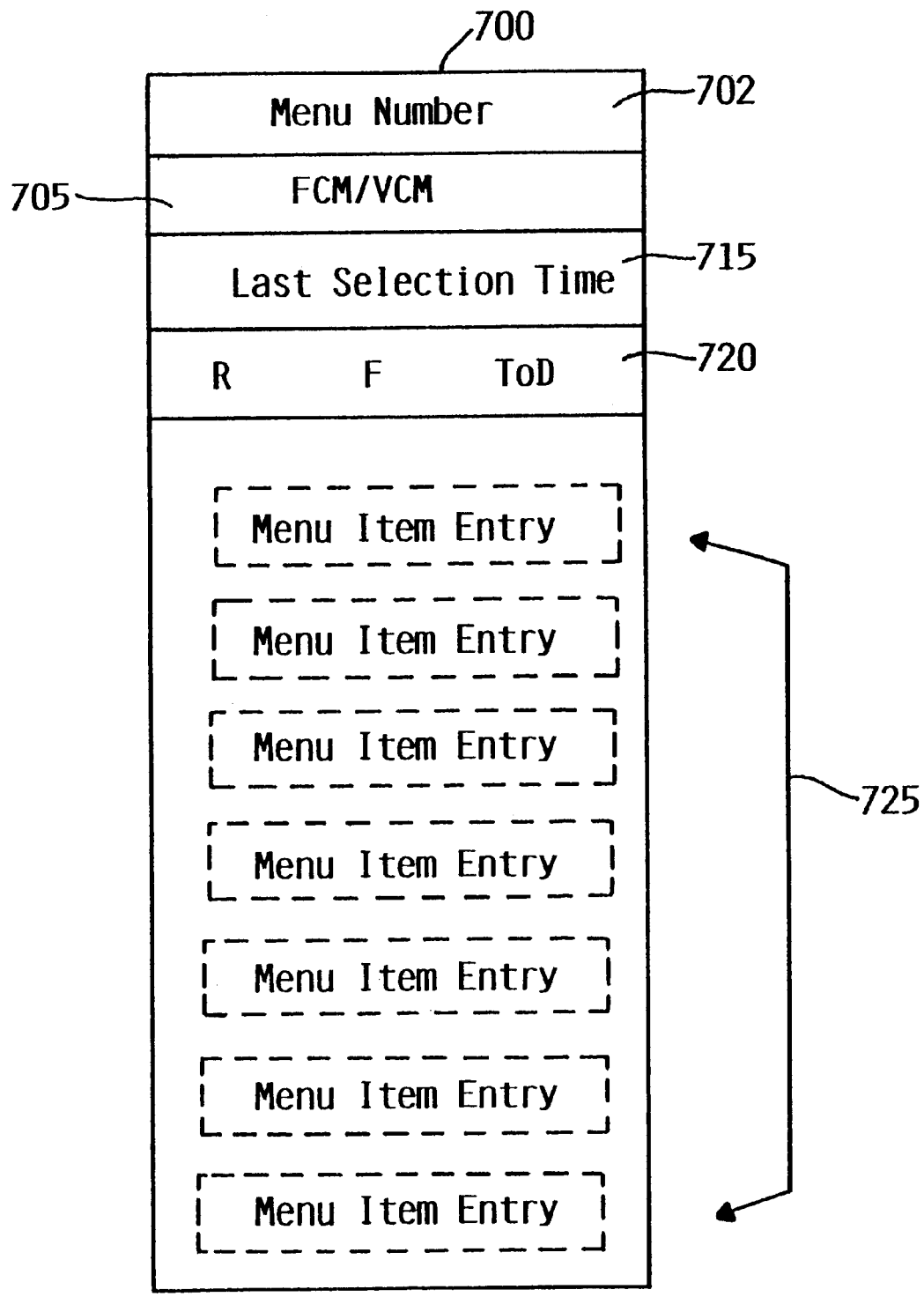
FIG. 7 is a block diagram of the menu record of the preferred embodiment.
Figure 8:
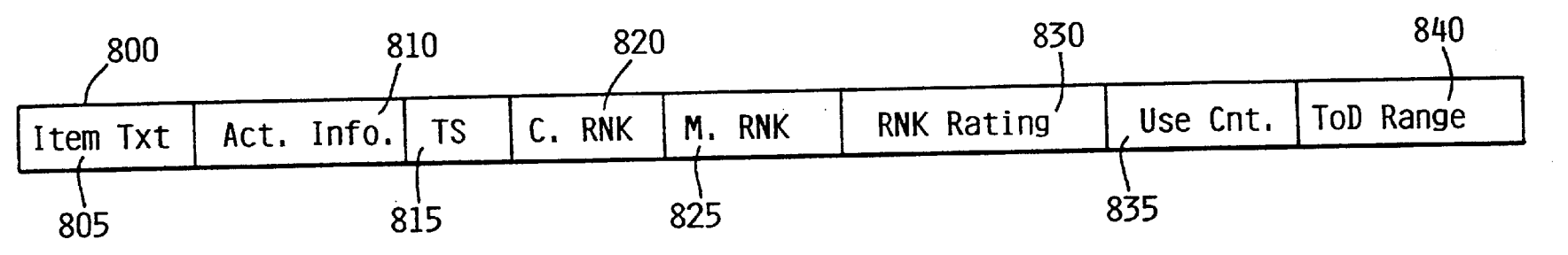
Figure 14A:
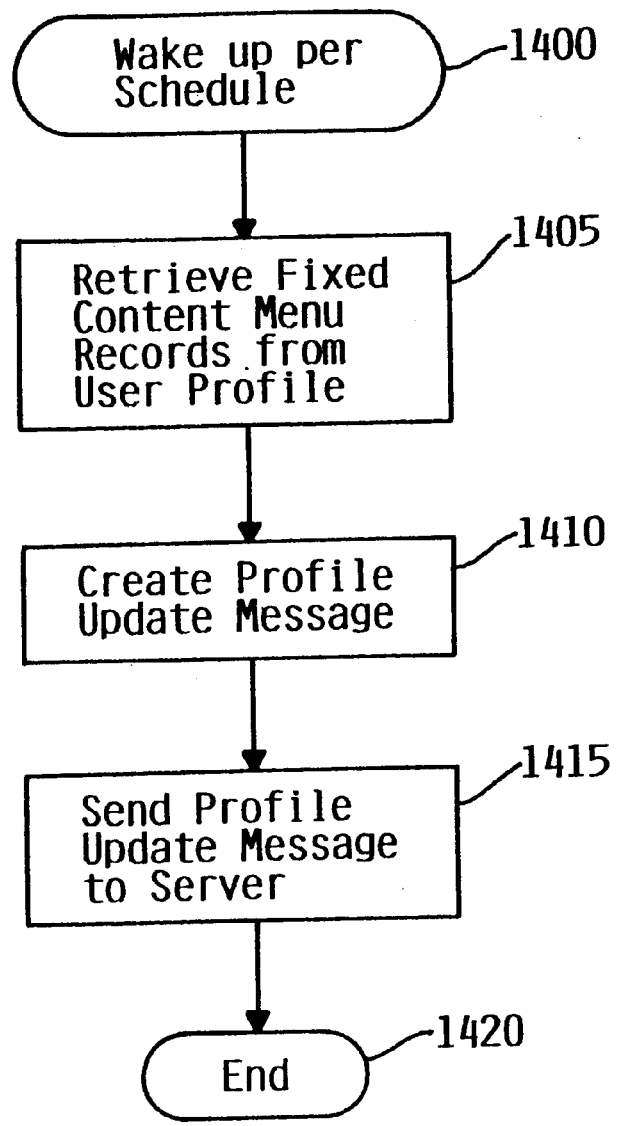
FIG. 14A is a diagram that shows the steps used to carry out the processing of the profile feedback mechanism of the preferred embodiment.

Menu adjuster 255, which is explained in more detail in the text associated with FIGS. 10A through 10D, is the mechanism that is primarily responsible for arranging the menus of the preferred embodiment. Menu initializer 260, which is explained in the text associated with FIG. 4A, is the mechanism that is responsible for interacting with the user to establish preferences and for the initial arrangement of the menus of the preferred embodiment. Profile feedback mechanism 265, which is explained in more detail in the text associated with FIG. 14A, is responsible for notifying the server of menu item arrangement changes, so that those changes can be incorporated into master profiles of a given type. User profile 270, which is explained in more detail in the text associated with FIGS. 6 through 8, is the data structure that houses the majority of the information used by the mechanisms of the preferred embodiment. Operating system 220 is the multitasking operating system known in the industry as IBM OS/2 Warp, although those skilled in the art will appreciate that other operating systems could be used.

Client 200 utilizes well-known virtual addressing mechanisms that allow its programs to behave as if they have access to a single, large storage entity (i.e., instead of access to multiple, smaller storage entities such as main memory 225 and HDD 240). Therefore, while IBM WebExplorer 250, menu adjuster 255, menu initializer 260, profile feedback mechanism 265, user profile 270, and operating system 220 are shown to reside in main memory 225, those skilled in the art will recognize that these programs are not necessarily all completely contained in main memory 225 at the same time. For example, portions of operating system 220 will reside in main memory 225 while executing on CPU 205, but will at other times reside on HDD 240. (The term memory is used herein to generically refer to storage that spans the entire virtual address space of a computer system, irrespective of the particular physical devices that make up that storage.) We should further point out here that the programs shown in main memory 225 need not necessarily all simultaneously reside on client 200. Indeed, this latter scenario would likely be the case if client 200 were a network computer, and therefore, be dependent upon an on-demand shipping mechanism for access to mechanisms or portions of mechanisms that resided on server 300.

Display adapter 230 is used to directly connect a display device to client 200. It should be understood that the present invention can be used to arrange any menu of user-selectable items regardless of the medium that is used to present that menu. In other words, although the preferred embodiment arranges menu items visually on a computer screen or other display device, the invention is equally usable on a non-visual presentation device such as an auditory interface that uses synthesized speech or a tactile interface that uses the Braille system of raised dots.

Network adapter 210 is used to connect client 200 to server 300. In the case of the preferred embodiment, this connection is between network adapter 210 and network interface 310 of server 200. If client 200 had been one of the so-called "thin client" computer systems (e.g., such as the IBM Network Station) the connection would be between network adapter 210 and terminal interface 330 of server 300.

Figure 2B:
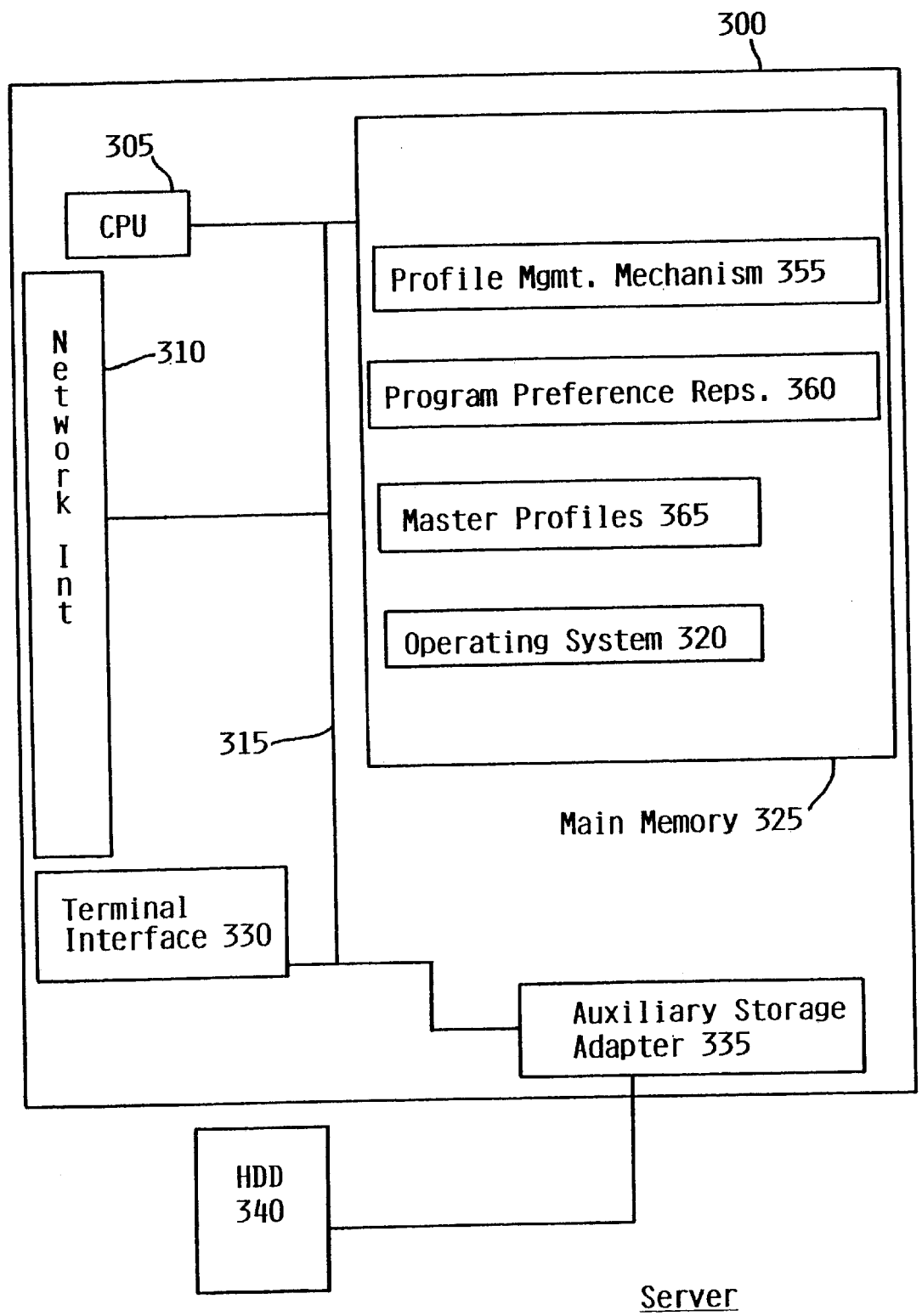
FIG. 2B is a block diagram of the server computer system that is used in the preferred embodiment of the present invention.

FIG. 2B is a block diagram that shows further details of server 300. Server 300 is an enhanced IBM AS/400 computer system; however, those skilled in the art will appreciate that the mechanisms and apparatus of the present invention are not limited to the particular type of system used in the preferred embodiment. As shown, server 300 comprises main or central processing unit (CPU) 305, which is connected to main memory 325, terminal interface 330, auxiliary storage interface 335, and network interface 310. These system components are interconnected through the use of system bus 315. Auxiliary storage interface 335 is used to connect mass storage devices (such as Hard Disk Drive 340) to server 300.

Figure 15A:
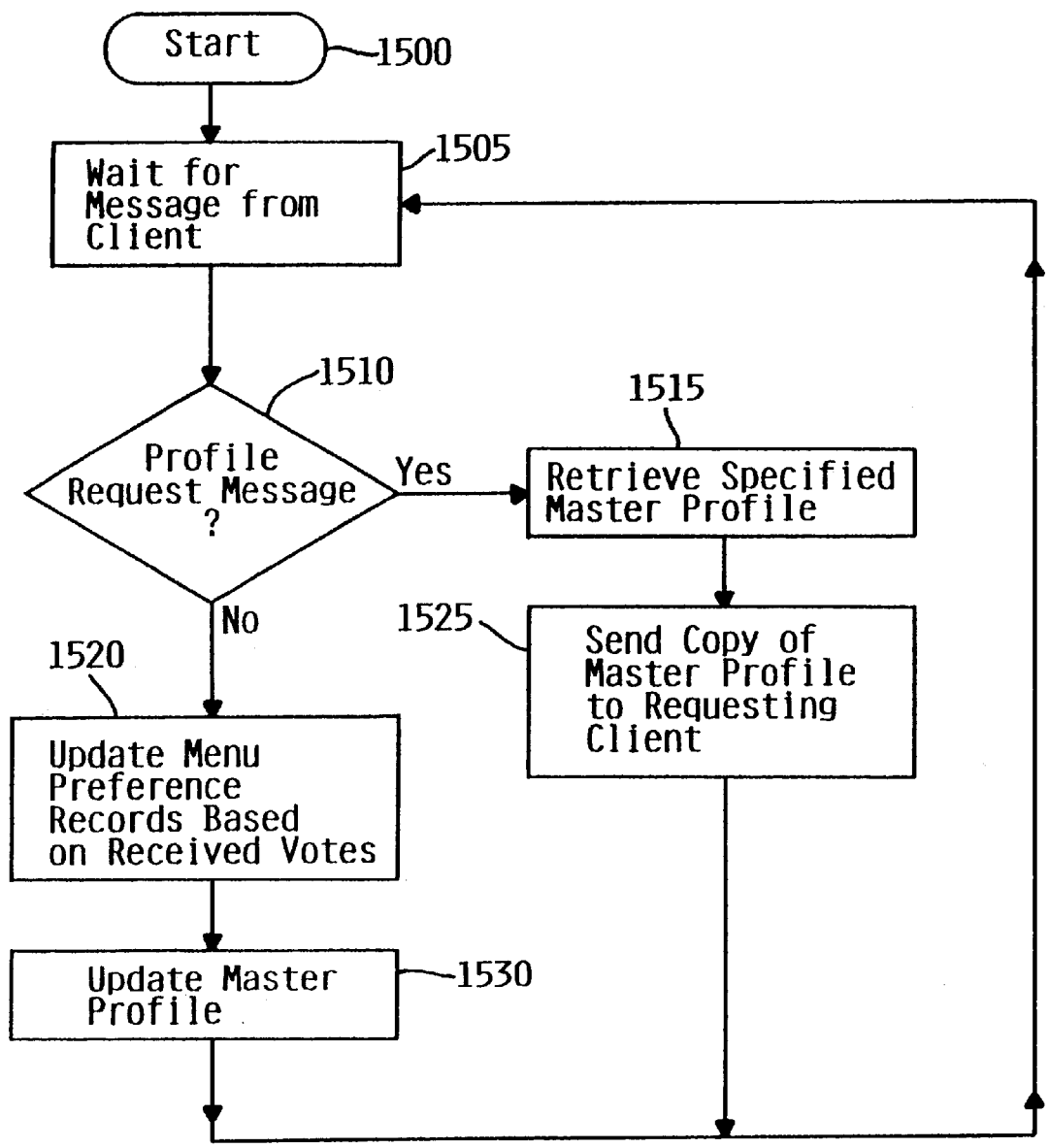
FIG. 15A is a diagram that shows the steps used to carryout the processing of the profile management mechanism of the preferred embodiment.

As shown, main memory 325 contains profile management mechanism 355, program preference repositories 360, master profiles 365, and operating system 320. Profile management mechanism 355, which is explained in more detail in the text associated with FIG. 15A, is the mechanism that is responsible for sending copies of master profiles 365 to requesting clients and for continually updating master profiles 365 with changes in use patterns so that they can each accurately reflect historical menu arrangements for a particular user type.

Operating system 320 is a multitasking operating system, known in the industry as OS/400; however, those skilled in the art will appreciate that the spirit and scope of the present invention is not limited to any one operating system.

The interfaces (called input/output processors in AS/400 terminology) that are used in the preferred embodiment each include separate, fully programmed microprocessors that are used to off-load compute-intensive processing from CPU 305. However, those skilled in the art will appreciate that the present invention applies equally to computer systems that simply use I/O adapters to perform similar functions.

Terminal interface 330 is used to directly connect one or more terminals to server 300. These terminals, which may be non-intelligent or fully programmable workstations (e.g., such as those known in today's nomenclature as "network stations" or "thin clients"), are used to allow system administrators and users to communicate with server 300. Network interface 310 is another means by which other computer systems and/or workstations can be connected to server 300 (i.e., in network fashion). It should be noted, though, that the present invention applies equally no matter the exact connection mechanism that is used. The important point is that server 300 can be connected to other computer systems and/or workstations. It is not important whether the connection(s) is made using present-day analog and/or digital technique or via some networking mechanism of the future.

As a final preliminary matter, it is important to note that while the present invention has been (and will continue to be) described in the context of fully functional computer systems, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media, such as floppy disks, hard disk drives, and CD ROMs and transmission type media, such as digital and analog communications links.

Terminology—Fixed Content Menus v. Variable Content Menus

Figure 11:
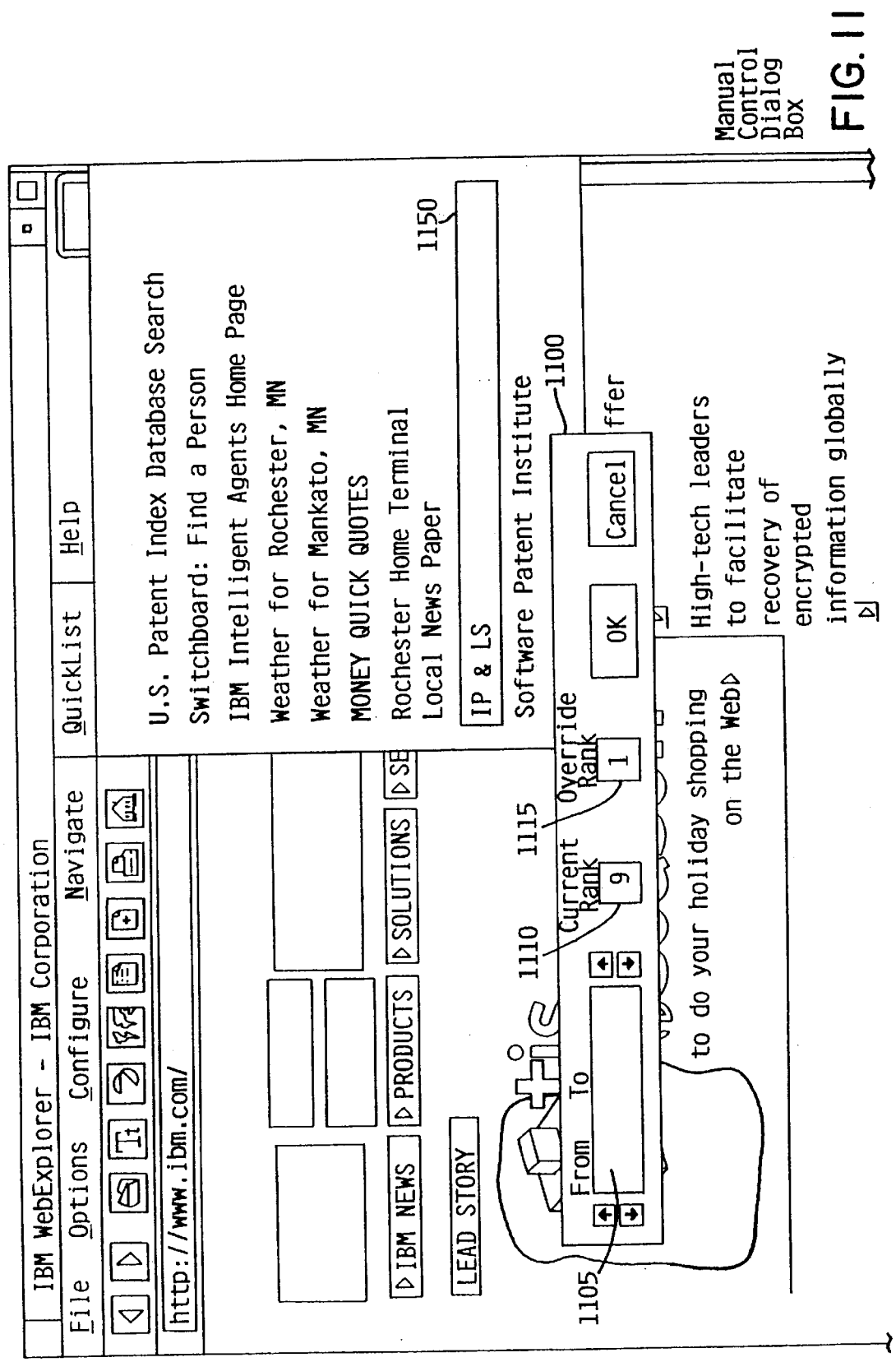
FIG. 11 is a diagram that shows how the manual control dialog box of the preferred embodiment is used to initiate the manual ranking control facility of the preferred embodiment.
Figure 12:
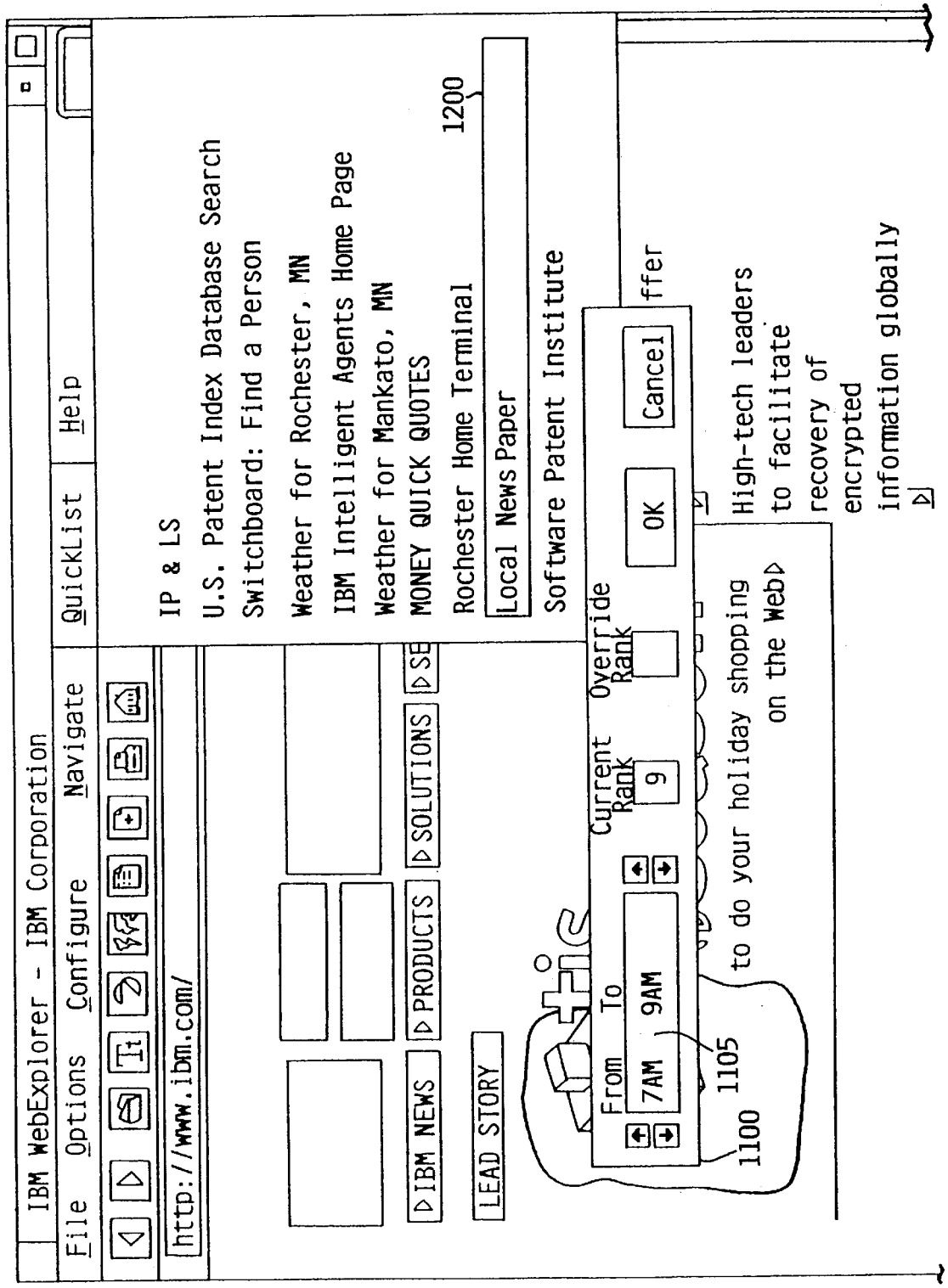
FIG. 12 is a diagram that shows how the manual control dialog box of the preferred embodiment is used to initiate the manual time of day control facility of the preferred embodiment.

Before proceeding too far into an explanation of the preferred embodiment, it is important for us to reiterate our use of certain terminology for the description of different types of menus. We use the phrase fixed content menu to describe those menus that have items that remain the same over time. The Configure menu of FIG. 3 is a good example of this type of menu. We use the phrase variable content menu to describe those menus that can have different menu items over time. These menus are usually managed through recency control in prior art menu management mechanisms, with the items being ranked on the list from most recent to least recent. The QuickList menu that appears on FIGS. 11 and 12 is a good example of a variable content menu, although it is not, and should not be considered, a prior art menu. Lastly, it should be noted that some prior art menus have fixed content portions and variable content portions (i.e., portions that always have the same items and portions that change based on use). These menus are referred to herein as mixed menus. While the program used in the preferred embodiment (i.e., WebExplorer 250) does not include a mixed menu, it should be understood that the teachings of the present invention apply equally to this type of menu and that the mechanisms of the preferred embodiment would require only slight change (i.e., menu adjuster 255 would need to be modified to be scoped to window portions instead of to entire windows, as is described in the ensuing paragraphs) to accommodate mixed menus.

Figure 3A:
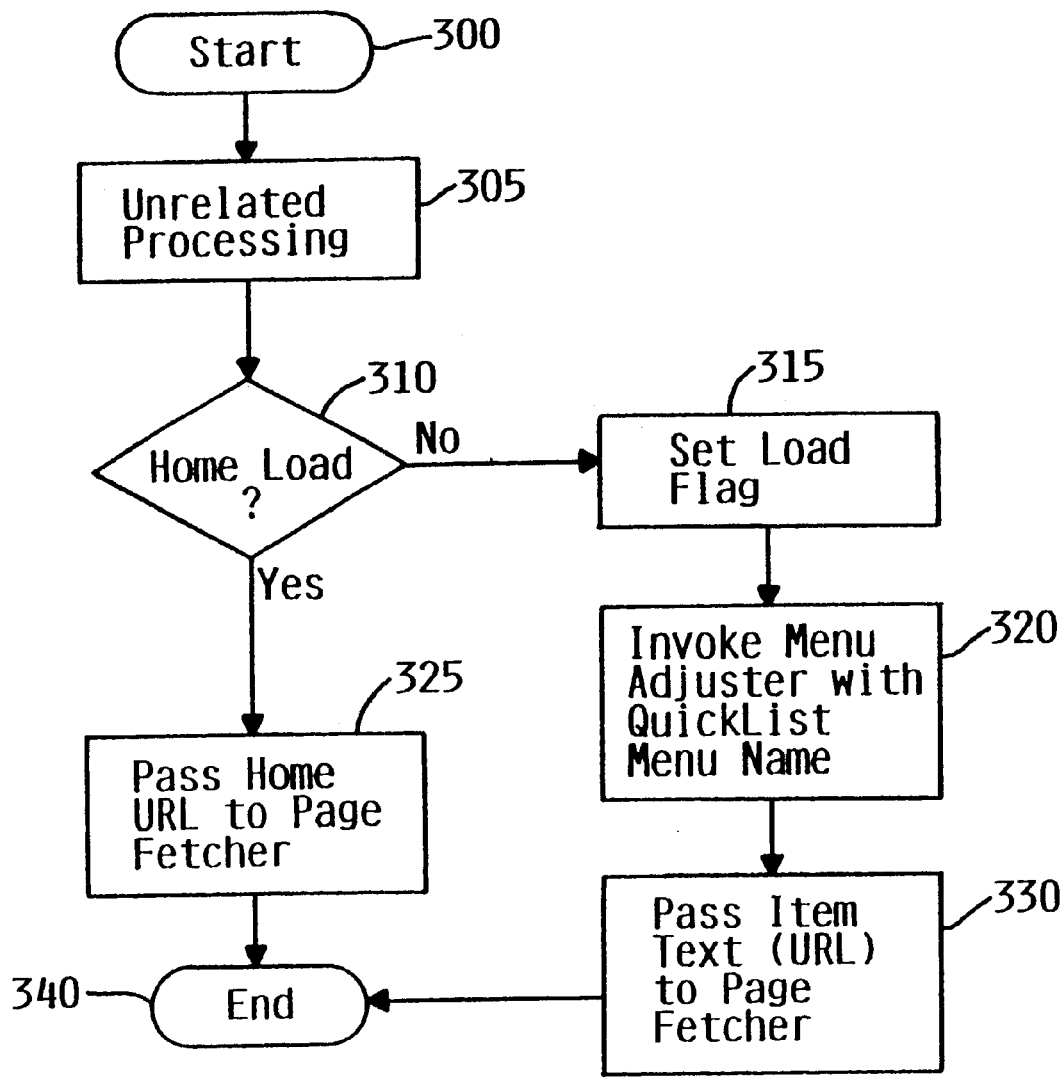
FIG. 3A is a diagram that shows the steps used in the preferred embodiment to carry out a portion of the smart load facility of the present invention.

FIG. 3A shows certain steps used in the preferred embodiment to carry out the smart load facility of the present invention. When WebExplorer 250 is first activated by a user, it will perform it normal initialization and present a web page to its user. WebExplorer 250 has been enhanced to allow the user to have a selected home-base page presented (as is seen in prior art web browsers) or to have the first page in the QuickList menu presented (i.e., as represented by the first URL on the list). This facility provides benefits to the user beyond the flexibility of having two choices. As will be explained in more detail in the forthcoming pages, the menus of the QuickList menu and the other menus of the present invention can be configured to have their menu items arranged based on a variety of heuristic factors and/or based on two different manual controls. This means that the first web page that is presented to the user can be configured to be one that makes the most sense in light of the past web pages that have been presented to the user or in light of manual control choices that were explicitly put in place by the user.

The initialization of WebExplorer 250 begins in block 300 of FIG. 3A. Block 305 represents initialization processing that is unrelated to the smart load facility of the preferred embodiment. In block 310, the home load flag is checked to determine whether the user wants to see a selected home-base page or the web page that appears at the top of the QuickList menu. This determination is made through reference to home load flag 617 of user profile 600. If home load flag 617 is set, the URL for the selected page is passed to the mechanism within WebExplorer 250 that is responsible for retrieving web pages based on a URL (this mechanism is referred to herein as the page fetcher) {block 325}.

If home load page 617 is not set, a load flag is set {block 315} and menu adjuster 255 is invoked with the QuickList menu name {block 320}. The load flag, which is used to inform menu adjuster 255 that it is being invoked during initialization, is kept internally to WebExplorer 250, although those skilled in the art will appreciate that other tracking mechanisms are possible. Menu adjuster 255 performs certain processing and returns the first URL in the QuickList back in block 330. The specific processing within menu adjuster 255 is not discussed here to avoid confusion. However, it is described fully in the text associated with FIGS. 10A and 10B. The returned URL is then passed to the page fetcher {block 330}.

Figure 3B:
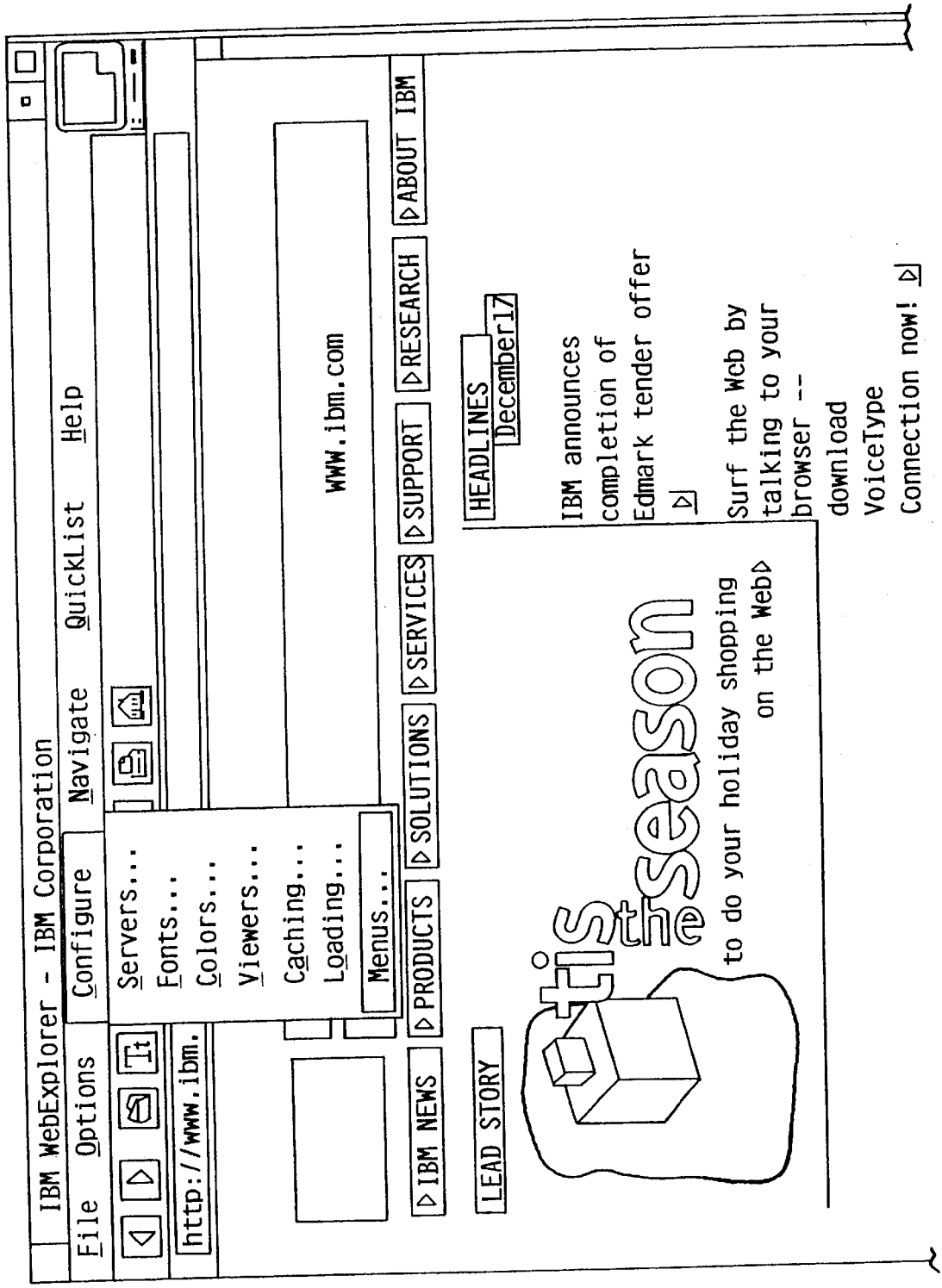
FIG. 3B is a diagram that shows the initial steps taken by the user to initiate the menu initializer of the preferred embodiment.

FIG. 3B shows one view of the graphical user interface of the preferred embodiment. As shown, WebExplorer 250 has been enhanced to include a "Menus . . . " menu item selection option in its "Configure" menu. Selection of this option allows the user to interact with menu initializer 260.

Figure 4B:
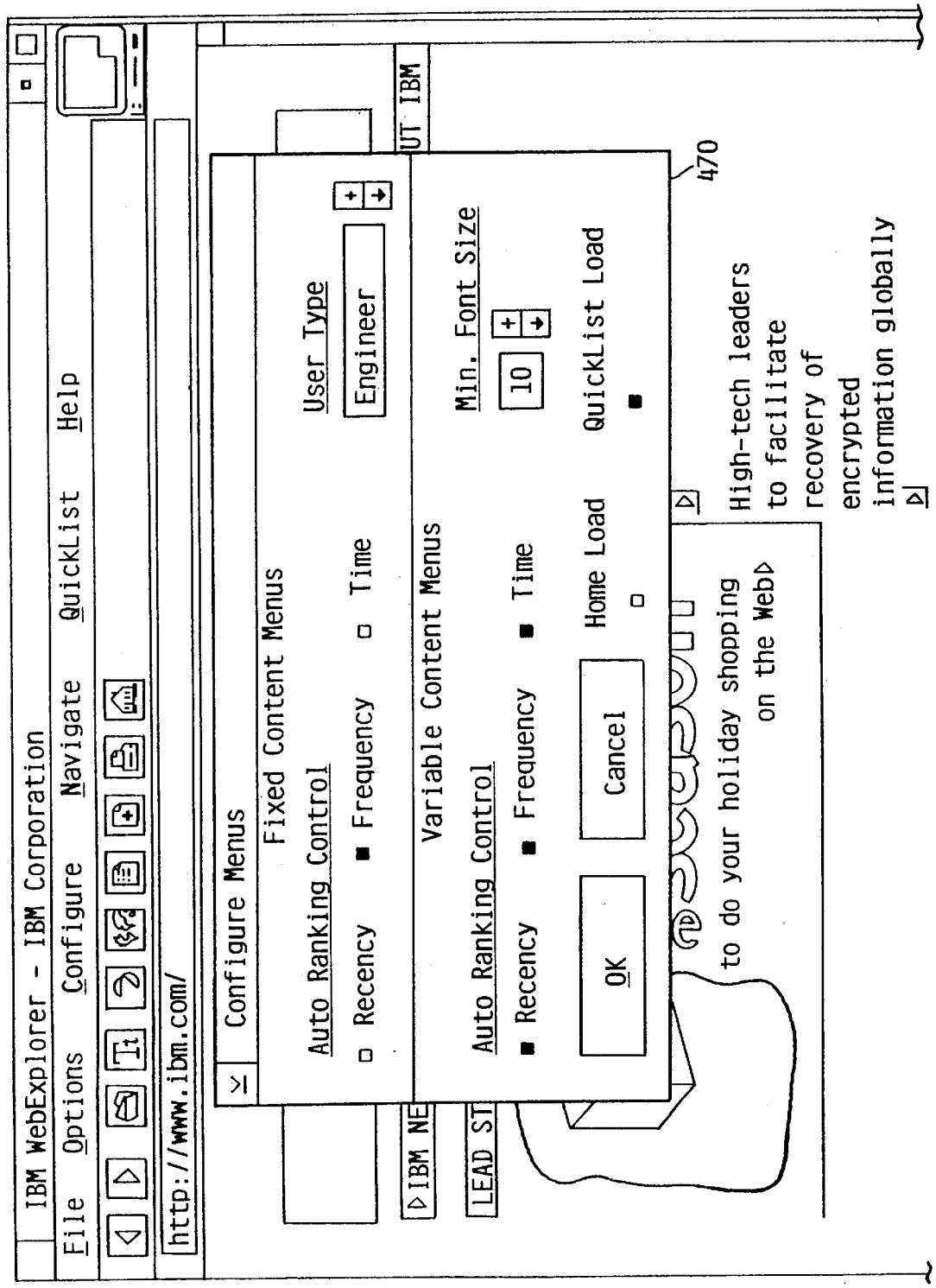
FIG. 4B is a diagram that shows the menu configuration dialog box of the preferred embodiment.

FIG. 4A is a diagram that shows the steps used to carry out the processing of menu initializer 260 of the preferred embodiment. When initiated, menu initializer 260 immediately displays the menu configuration dialog box of the preferred embodiment {block 405} and waits for an "OK" selection event in block 410. Menu configuration dialog box 470 of the preferred embodiment is shown on FIG. 4B. As shown, this dialog box allows the user to select the heuristic factors that he or she wants accounted for during menu arrangement. The user may choose to have menu items arranged based on the relative length of time since the menu items were selected, with the items being ranked presented (ranked) from most recent to least recent {referred to herein as automatic recency control}; the user may choose to have menu items arranged based on how often the individual items are selected in comparison to the other items on the same menu, with the items that are selected most frequently being present first {referred to herein as automatic frequency control}; and/or the user may choose to have their menu items arranged based on the time of day at which a given menu item was last selected, with items that were last selected during the "current period" of the day being presented before those that were not last selected during the "current period" of the day {referred to herein as automatic time of day control}. The reader should also note that while the mechanisms of the preferred embodiment allow users to select a single heuristic factor for consideration during menu item arrangement, most users will configure the mechanisms of the preferred embodiment to have several heuristic factors simultaneously considered during automatic menu arrangement (see FIG. 4B, for example, where the user has enabled automatic recency, frequency, and time of day control for variable content menus). It should also be noted that while the automatic ranking control feature of the preferred embodiment can be individually applied to fixed content or variable content menus, other applications of automatic ranking control would also fall within the spirit and scope of the present invention. For example, an equivalent mechanism (in the patent law sense) would be one that did not distinguish between fixed content and variable content menus.

The user is also able to select a profile type (shown here as type "Engineer") and a minimum font size. The profile type information is used to obtain the correct master profile from server 300 for initial menu arrangement, and to provide feedback to server 300 about selection patterns for a user that selected the specified profile type. Minimum font size control, which is explained in the text associated with FIG. 10C, allows the menu management mechanism of the present invention to automatically adjust font size within a certain range, so as to maximize the number of menu items that can be placed into a variable content menu that has a fixed window size.

Lastly, the user is able to configure WebExplorer 250 to present a selected home-base web page through selection of the Home Load option or to present the page associated with the first URL in the QuickList menu through selection of the QuickList Load option. These latter two options control the smart load facility of the present invention. When the Home Load option is selected, home load flag 617 of user profile 600 is set to TRUE and when the QuickList Load option is selected, home load flag 617 is cleared. The smart load facility was described in the text associated with FIG. 3A and will be described further in the text associated with FIG. 10A.

Returning now to FIG. 4A, menu initializer 260 screens selection events for "OK" and "Cancel" events {blocks 415 and 417}. A cancel event results in termination of processing in block 450; whereas, an OK event results in a determination of whether user type information was input by the user {block 420}. (As an aside, please note that we use the phrase user type interchangeably with the phrase profile type.) If so, menu initializer 260 determines whether this is a first time setup of the menu arrangements or a subsequent configuration change. (In the preferred embodiment, this is information that is stored internally to WebExplorer 250, although those skilled in the art will appreciate that other equivalent means exist for determining whether or not an initialization request was a first time request.) If this is a subsequent configuration change (e.g., a change to a heuristic factor and not a complete initialization), the user is asked whether they want to replace their current menu item arrangement with that of the master profile that resides on the server. (This dialog box is not shown.) In any case, a first time initialization or a request to replace an existing arrangement will cause menu initializer 260 to send a profile request to the server {block 425} and wait for return of the profile in block 430. The profile request contains information about the type of profile needed (i.e., "Engineer" in this case) and the program for which it is needed (i.e., WebExplorer in this case). Please refer to the text associated with FIG. 15A for details about how profile requests are received and handled at the server.

When the copy of the master profile is received from the server (i.e., server 300 in this case), menu initializer 260 schedules profile feedback mechanism 265 for execution in block 435. In the preferred embodiment, profile feedback mechanism 265 is scheduled to wake up and perform its processing every 7 days, although other schedules are possible. After profile feedback mechanism 265 has been scheduled, menu initializer 260 updates the user's profile to match that of the master profile {block 445}. In the case where no profile request is sent (i.e., because the user does not want their user profile to be changed), the existing menu item arrangements are preserved. These existing arrangements are default arrangements in the case of a first time initialization or current arrangements in the case of a subsequent user configuration change.

Regardless of whether a profile request was sent to the server, menu initializer 260 updates the user's profile to reflect the user's recency, frequency, time of day, profile type, minimum font, and load settings. Menu initializer 260 then ends its processing in block 450.

Figure 5:
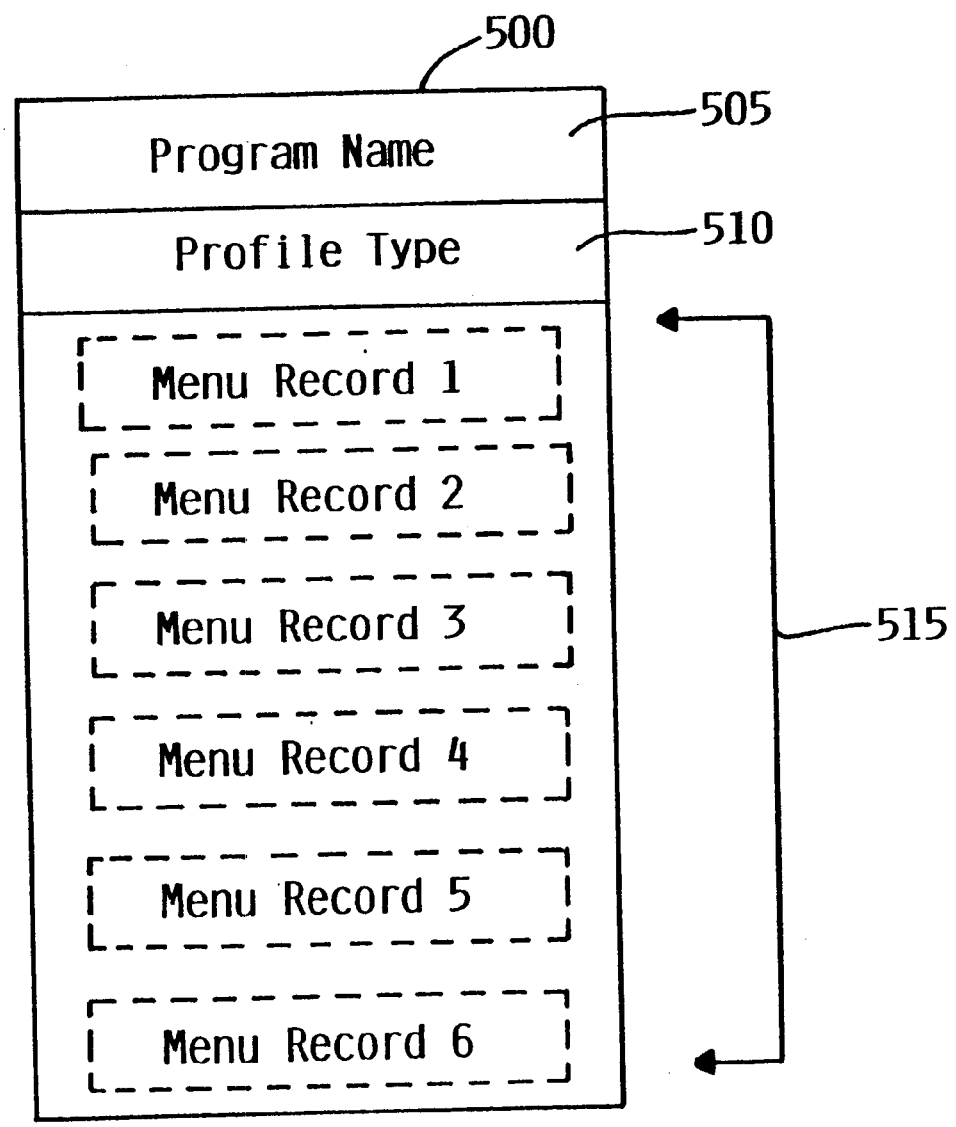
FIG. 5 is a block diagram of the master profile of the preferred embodiment.

FIGS. 5 through 8 show the profile structures of the preferred embodiment. FIG. 5 shows the master profile structure of the preferred embodiment. As shown, master profile 500 is comprised of program name field 505, profile type field 510, and a series of menu records (shown as menu records 515). Program name field 505 is used to identify the particular program for which the profile is being used. In our example, program name field 505 would contain an identifier for the WebExplorer program. Profile type field 510 is used to identify the particular type of profile at issue. In our example, the user entered type "Engineer" in the user type field of menu configuration dialog box 470 of FIG. 4B. Other types of profiles might be "Programmer," "Secretary," "Scientist," "Doctor," etc. The profile type and program name fields are used to identify a particular master profile. Menu records 515 each contain information about individual menus for the subject program. For example, master profile 500 contains on menu record for each of the six menus of the WebExplorer 250 (i.e., File, Options, Configure, Navigate, Quicklist, and Help).

FIG. 6 shows the user profile structure of the preferred embodiment. As shown, user profile structure 600 is comprised of user name field 605, profile type field 610, minimum font size field 615, and menu records 620. User name field 605 is used to distinguish between users in the case where more than one user has access to a single program. Here we are assuming that only one user has access to WebExplorer 250, so user name field 605 can be ignored. User name field 605 would be used in the case were multiple users were using the same program (e.g., possibly in a standalone or host-based computer configuration). Profile type field 610 is used by profile feedback mechanism 265 to send use pattern change information back to server 300 for ultimate inclusion in the master profiles. Minimum font size field 615 is used to store the minimum font size entered by the user in menu configuration dialog box 470 of FIG. 4B. As mentioned, this field is used to maximize the number of items that can be placed in variable content menus that have a fixed window size. Home load flag 617, which has a default value of TRUE, is used by menu initializer 260 to determine whether the user wants to load a selected home-base web page, or the first web page in the QuickList, after initialization of WebExplorer 250. When set to TRUE, home load flag 617 indicates that a home-base page should be loaded and when cleared (i.e., FALSE), home load flag 617 indicates that the first page in the QuickList should be loaded. Menu records 620 have the same function as that described with reference to menu records 515, and it is these records that are initialized with those of the master profile. Once initialized, these records are used to track user selection patterns and to arrange the presentation of the associated menus appropriately.

FIG. 7 shows the menu record structure of the preferred embodiment. Menu record structure 700, which is the structure used for menu records 620 of FIG. 6, comprises menu number 702, fixed content menu/variable content menu (FCM/VCM) flag 705, last selection time field 715, recency, frequency, and time of day flags 720, and menu item entries 725. Menu number 702 is used by menu adjuster 255 to map a menu name to a menu record. FCM/VCM flag 705 is used to determine whether the menu represented by the subject menu record is a fixed content menu or a variable content menu. Last selection time field 715 is used to house the last date and time that the subject menu had a menu item selected. This information is used to consider recency of selection during menu arrangement. Recency, frequency, and time of day flags 720 are used to determine whether the user wants recency, frequency, and time of day considered during menu arrangement.

FIG. 8 shows the menu item entry structure of the preferred embodiment. Menu item entry structure 800, which is the structure used for menu item entries 725 of FIG. 7, is used to store information that is used to control the placement of individual menu items in a menu. As shown, menu item entry structure 800 comprises item text 805, activation information 810, time stamp 815, current rank 820, manual rank 825, rank rating 830, use count 835, and time of day range 840. Item text 805 is the field that contains the textual identifier for the item at issue. For example, the item text field for the highlighted item on the Configure menu of FIG. 3 contains the text "Menus . . . ".

Activation information field 810 contains location information about the item that is the subject of the selection. In some cases, activation information field 810 will contain no more than information about the location of the program that is to be initiated when the subject menu item is selected by the user. For example, the activation information field for the highlighted item on the Configure menu of FIG. 3 contains information about the location of menu initializer 260. In other cases, activation information field 810 may contain the location of the program that is to be initiated when the subject menu item is selected and location information about a parameter that is to be passed to the program upon initiation. For example, the QuickList menu (shown inactivated on FIG. 3) contains a list names for Uniform Resource Locators (URLs) as item text. A URL must be passed to the page fetcher so that the associated file (i.e., the file associated with the URL name) can be retrieved for the user upon selection of a given menu item.

Time stamp field 815 is used to track the last date and time that the subject menu item was selected. This field is used for the automatic recency and the automatic time of day control facilities. These facilities are described in the text associated with FIGS. 10A through 10D. Current rank field 820 contains the current rank of the menu item at issue. For example the current rank of the "Menus . . . " item of FIG. 3 is seventh (i.e., seventh out of seven items). Manual rank field 825 is used for the manual rank control facility of the preferred embodiment. This facility is explained in more detail in the text associated with FIGS. 10A through 11. Rank rating field 830 and use count field 835 are used during automatic ranking control. These fields are explained in more detail in the text associated with FIGS. 10A through 10D. Time of day range field 840 is used for manual time of day control, which is a facility that is explained in more detail in the text associated with FIGS. 10A through 11.

FIG. 9 is the menu name to menu number mapping structure of the preferred embodiment. As shown, mapping structure 900 is essentially a table that contains a series of menu name/number pairs. A user's access of a menu (i.e., a menu access event) is received by menu adjuster 255. When this occurs, menu adjuster 255 is given the selected menu's name. Menu adjuster 255 then uses mapping structure 900 to locate the corresponding menu record within user profile 600. For example, though not described earlier to promote linear progress/understanding of the invention, the user's access of the Configure menu on FIG. 3 was received by menu adjuster 255. Menu adjuster 255 then used mapping structure 900 to retrieve the menu record associated with the Configure menu (i.e., menu record 620*a*) from user profile 600 and used the information contained in menu record 620*a* to arrange the menu for presentation to the user.

Menu Arrangement

Figures 1, 10A:
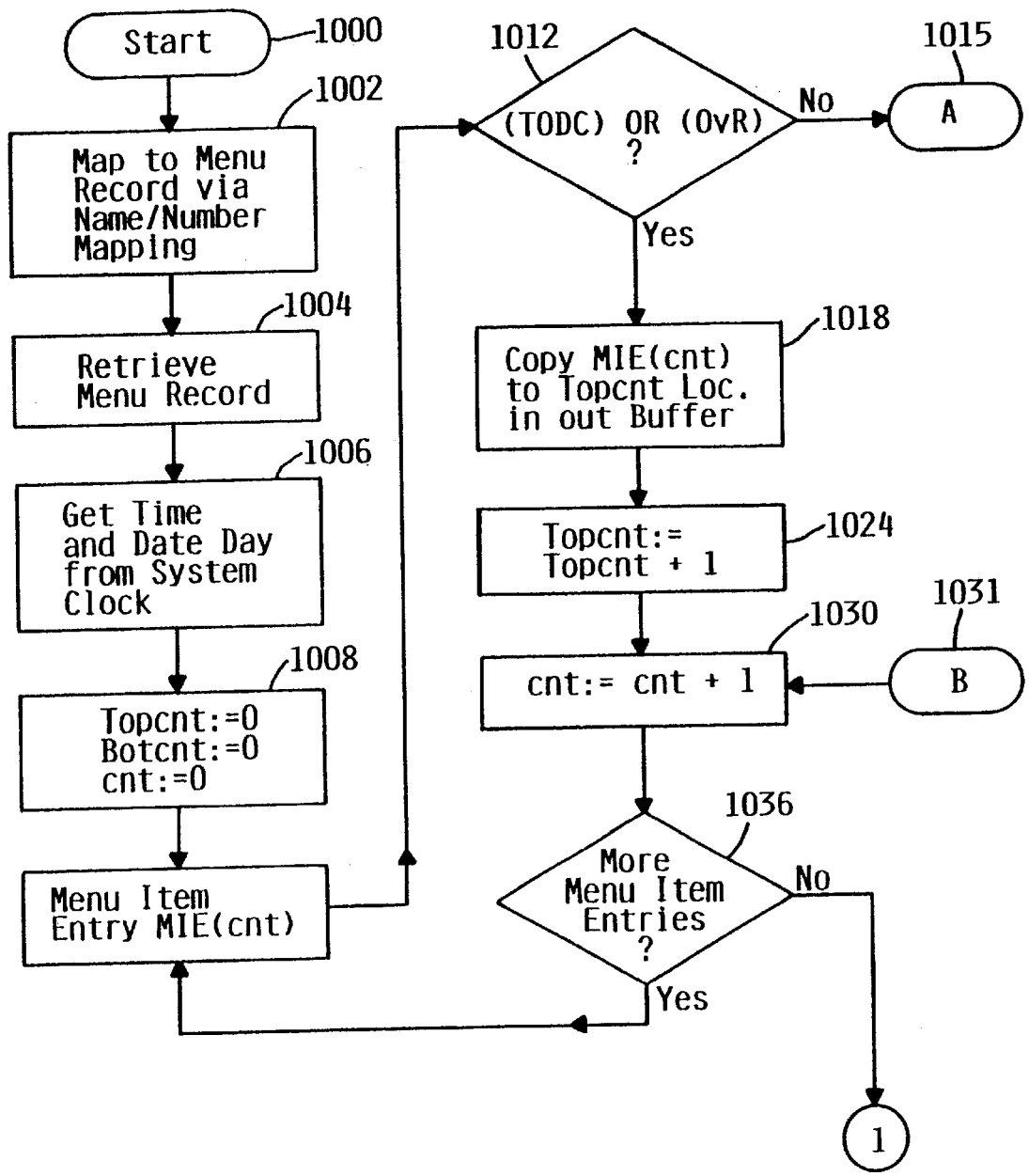
FIGS. 10A through 10D are diagrams that show the steps used to carry out the processing of the menu adjuster of the preferred embodiment.
Figures 2, 10A:
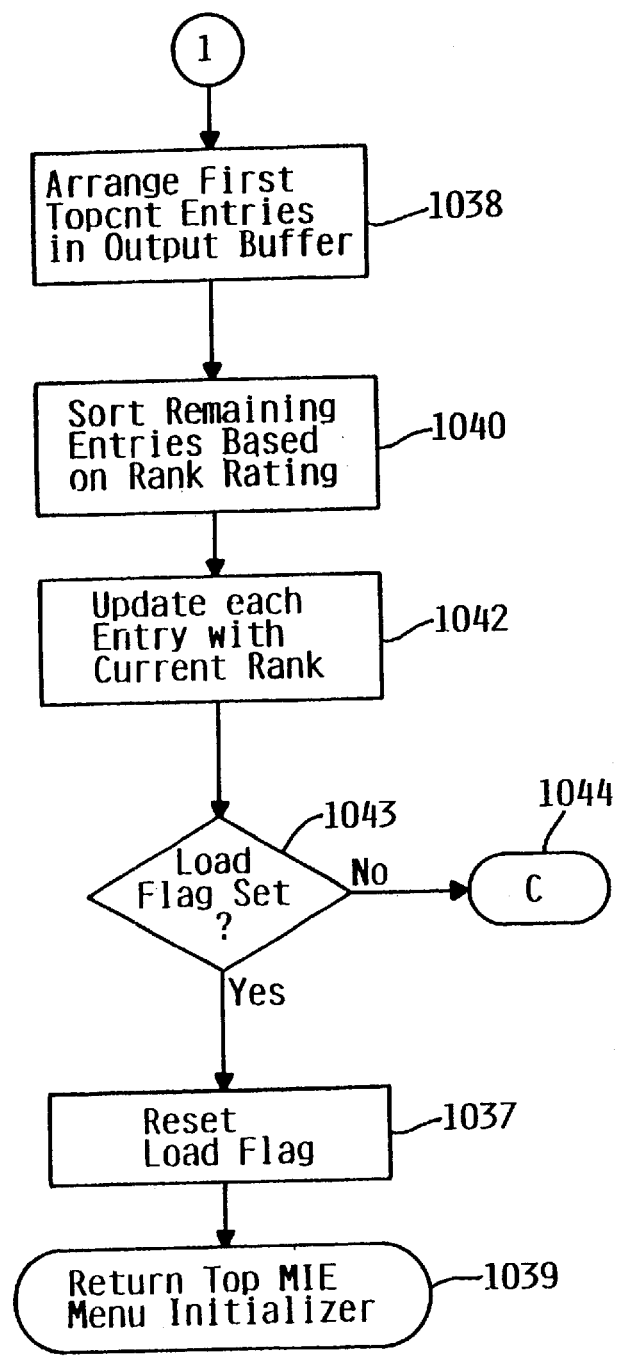

FIG. 10A shows the steps used to carry out the processing of menu adjuster 255 of the preferred embodiment. Blocks 1000, 1002, and 1004 illustrate the just-described receipt of the menu access event and retrieval of the associated menu record.

After the menu record has been retrieved, menu adjuster 255 retrieves the current time and date from the system clock of client 200 {block 1006—system clock not shown}. Menu adjuster 255 then sets three counter variables Topcnt, Botcnt, and cnt to zero {block 1008}. These counters are used to place menu items into an output buffer for presentation to the user. In block 1010, menu item entries are retrieved from the menu record that was itself retrieved in block 1004. Menu adjuster 255 first checks the retrieved menu entry to determine whether the user as enabled manual ranking control or manual time of day control for the subject menu item. The way in which these controls are enabled by the user is described in the text associated with FIGS. 10D through 12. At this point, however, it is important for the reader to understand how these manual control facilities work in relation to the automatic ranking control facilities of the preferred embodiment. As described earlier, the automatic ranking controls of the preferred embodiment (i.e., automatic recency, frequency, and time) are used alone or in combination as heuristic factors to automatically arrange the order in which the menu items of a menu are presented to the user. Manual ranking control, on the other hand, allows the user to manually control the placement of a given menu item irrespective of where in the list automatic ranking controls would have otherwise placed the item.

Figures 1, 10B:
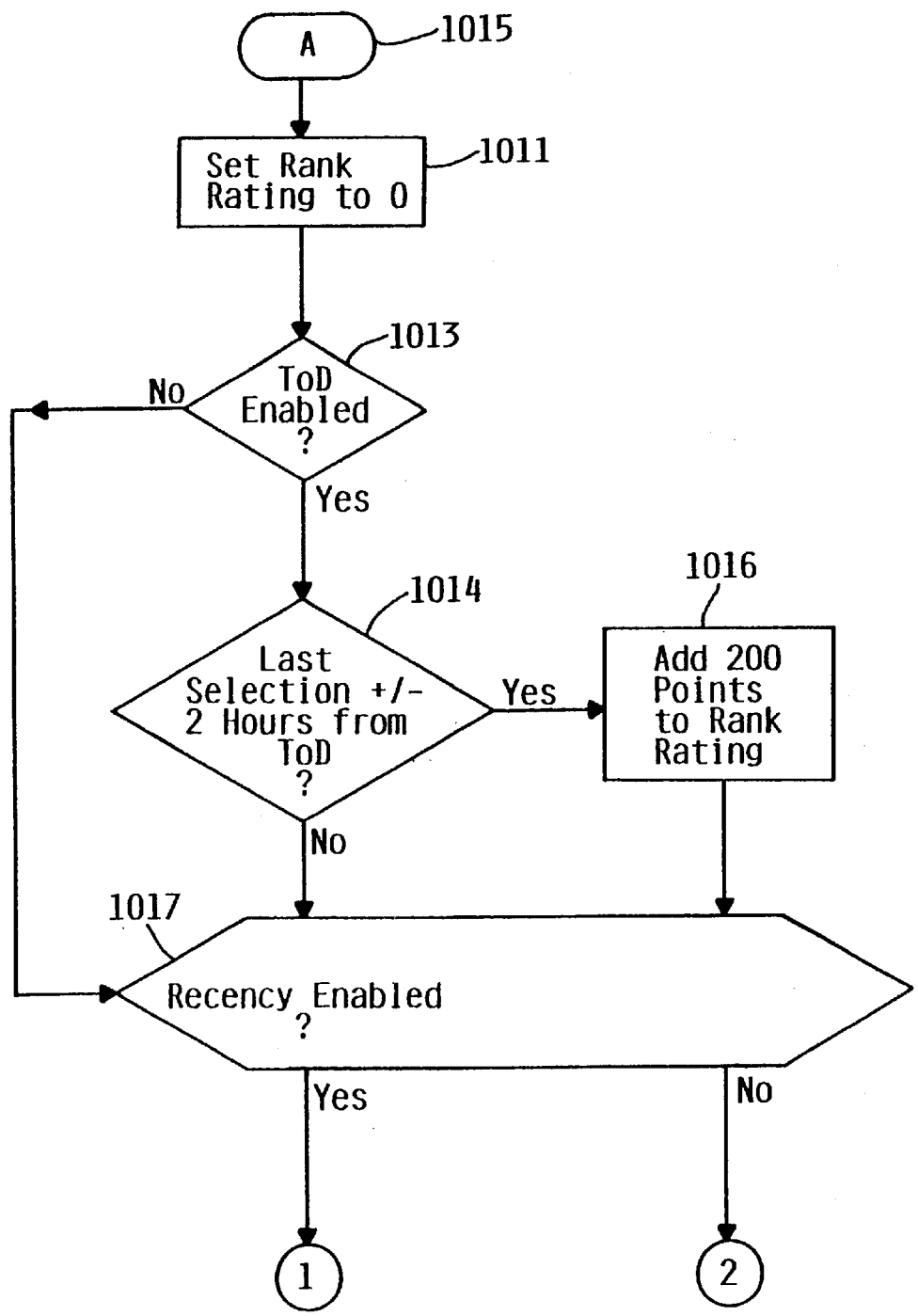
Figures 2, 10B:
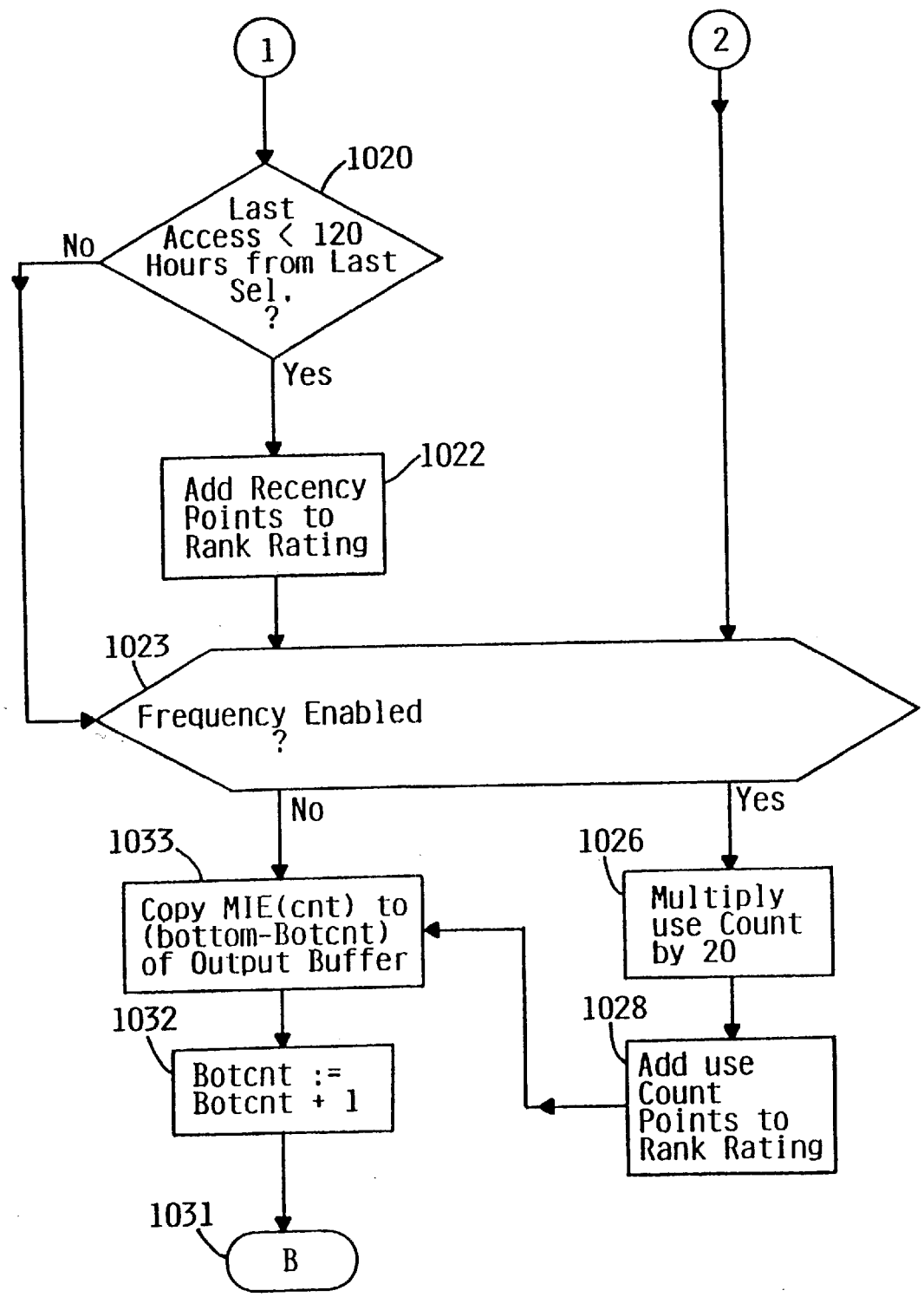

Manual time of day control works in a similar fashion by allowing the user to specify a time period during which the associated menu item must be ranked towards the top of the list (i.e., menu). Menu adjuster 255 determines whether manual control is at issue with the subject menu item through reference to manual rank field 825 and time of day range 840 (see FIG. 8). If manual rank field 835 has a value and/or if time of day range field 840 has a time range that starts before and ends after the time of day that was retrieved in block 1006, menu adjuster 255 knows that the subject entry is subject (in some way) to manual control. For the purposes of this explanation, assume here that the subject entry is not subject to manual control, which, as shown in block 1012, causes menu adjuster 255 to proceed to block 1011 (via connector 1015) of FIG. 10B. FIG. 10B contains most of the logic within menu adjuster 255 that supports automatic ranking control.

Automatic Ranking

The automatic ranking control logic of the preferred embodiment works by assigning points to menu items for the various heuristic factors and by arranging the menu items based on those points (i.e., from most to least). Please note, though, that the present invention is not limited to a point-based ranking scheme or to any one weighting methodology. It should also be noted that while a fixed point allocation scheme is used in the preferred embodiment, only a slight change to menu configuration dialog box 470, user profile structure 600, and menu adjuster 255 would be required to provide the user with the ability to specify individual point allocations for each of the various heuristic factors.

Points are awarded in the preferred embodiment in the following manner. Each menu item can receive up to a maximum of one thousand (1000) points, with 200 being allocated for automatic time of day control and 400 points each being allocated for automatic recency and frequency control. It is also important to note the significance of the difference between our use of the terms selection and access. The word selection is used to describe the activation of a particular menu item; whereas, the word access is used to refer to the access of the menu as a whole (i.e., the list containing the menu items that are potentially selected). Note that a menu may be accessed by a user without any of its menu items being selected (e.g., the user may have accessed the menu to see what it contained and then realized that a different menu contained the needed action). As the reader will see, calculations and point assignments are primarily made based on the timing and frequency of item selections, with the exception being time of day control, which assigns points based on the time of day of past menu selections relative to the time of day of a current menu access.

Automatic Time of Day Control

A menu item that is subject to automatic time of day control receives 200 time of day points. While it would be possible to award points as a matter of degree (i.e., relative closeness in time between the last time the subject menu item was selected and the time of day of the current menu access), the preferred embodiment uses the straightforward method of assigning 200 time of day points for menu accesses that occur within +/− two hours from the time of day that the subject menu item was last selected. This determination is made by comparing the time of day value in time stamp field 815 of FIG. 8 with the current time of day as retrieved in block 1006.

Automatic Recency Control

Recency points are awarded based on the time differential between the time that the subject menu item was last selected and the time at which any item of the menu was last selected. This calculation is made by comparing last selection time field 715 of menu record 700 (see FIG. 7) with the date and time value in time stamp field 815 (see FIG. 8) of the menu item entry for the subject menu item. The following table shows the distribution used in the preferred embodiment for automatic recency control points.

| Time Since Last Menu Access | Points |
| --- | --- |
| less than 1/2 hour | 400 |
| less than 1 hour | 350 |
| less than 12 hours | 400 |
| less than 24 hours | 250 |
| less than 48 hours | 200 |
| less than 72 hours | 150 |
| less than 96 hours | 100 |
| less than 120 hours | 50 |
| more than 120 hours | 0 |

Automatic Frequency Control

Frequency control points are awarded based on the number of times that a menu item has been selected in comparison to other menu items in the same menu. Frequency control points are calculated by multiplying the value in use count field 835 of menu item entry 800 (see FIG. 8) by twenty (20). Use counts are decremented by menu adjuster 255 for menu item selections that do not result in selection of the subject menu item. Use counts are decremented in this fashion to ensure that the use counts do not all ultimately weigh in at the 400 point maximum use count allocation.

In block 1011, the value in rank rating field 830 is set to zero (0).

Blocks 1013, 1014, and 1016 of menu adjuster 255 perform the automatic time of day control in the preferred embodiment. Menu adjuster 255 first determines whether the user has enabled automatic time of day control. If so, menu adjuster 255 determines whether the time of day at which the subject menu item was last selected was two hours before or two hours after the current time of day. This determination is made by comparing the time of day value in time stamp 815 of FIG. 8 with the time of day that was retrieved in block 1006. Note that while the preferred embodiment uses a four (4) hour time span to give effect to automatic time of day control, the spirit and scope of the present invention is not limited to any specific period of time, which means that the present invention should be considered to apply equally no matter what the exact choice of time period might be. If the last selection time was within a time period that is two (2) hours before or two (2) hours after the current time, menu adjuster 255 proceeds to block 1016, where it adds 200 time of day points to the rank rating for the menu item at issue.

Blocks of 1017, 1020, and 1022 of menu adjuster 255 perform the automatic recency control of the preferred embodiment. If the user has enabled automatic recency control {block 1027}, menu adjuster 255 determines whether the length of time between the date and time of the last menu item selection and the time and date that the subject menu item was last selected is more than one hundred twenty (120) hours. If not, the appropriate number of recency points are added to the rank rating (see the recency point distribution table above) in block 1022.

Blocks 1023, 1026, and 1028 of menu adjuster 255 perform the automatic frequency control of the preferred embodiment. If the user has enabled automatic frequency control {block 1023}, menu adjuster 255 multiplies the use count for the subject menu item (i.e., in the menu item entry) by 20 {block 1026} and adds the use count points to the rank rating {block 1028}.

Once the appropriate points have been added to rank rating field 830 of menu item entry 800, the menu item entry is copied into the output buffer at a location of Botcnt up from the bottom of the output buffer. For example, if the subject menu had seven (7) menu items and the Botcnt counter was equal to two (2) {i.e., because this was the third menu item that was being processed for automatic ranking control}, it would be placed in the fifth location in the output buffer. Note that menu items that are subject to automatic ranking control are inserted into the output buffer from the bottom up; whereas, menu items that are subject to manual control are inserted from the top of the output buffer down (as will be explained shortly). Once the subject menu item has been placed in the output buffer, the Botcnt counter is incremented {block 1032} (i.e., so that the next menu item that is subject to automatic control is placed in the output buffer in the location above this last menu item.

After the Botcnt counter has been incremented, menu adjuster 255 proceeds to block 1030 of FIG. 10A (via connector blocks 1031) to begin processing the next menu item entry. To do this, menu adjuster 255 first increments the cnt counter {block 1030} (i.e., so that the next menu item entry is chosen) and checks to see whether there are more menu item entries present in the subject menu record {block 1036}. For the purposes of our explanation, assume here that there are more menu item entries present in the menu record. This being the case, menu adjuster 255 proceeds to block 1010 to retrieve the next menu item entry from the menu record and determines whether this menu item is subject to manual control {block 1012}. Assume for the purposes of explanation that this menu item is subject to manual control.

Manual Control

As the reader may recall, manual control means that the user has enabled either manual ranking control or manual time of day control. When this is the case, menu adjuster 255 copies the associated menu item entry into the top portion of the output buffer {block 1018} (i.e., from the top down through use of the Topcnt counter), increments the Topcnt counter {block 1024}, increments the cnt counter {block 1030}, and again checks whether there are more menu item entries in the subject menu record. Assume here that menu adjuster 255 discovers that there are no more item entries in the menu record for the subject menu.

When menu adjuster 255 has completed its initial processing of all of the menu items in the menu record, it proceeds to arrange the manual ranking control entries in block 1038. In the preferred embodiment, manual time of day control is given precedence over manual ranking control, such that menu entries that are subject to manual time of day control will appear in the list before those that are only subject to manual ranking control. Where two or more manual time of day control entries are involved, they are placed at the beginning of the menu in alphabetical order. The reader should note that this approach may cause, in certain circumstances, a menu entry to be placed at a lower position (rank) in the menu than that which was specified by the user. However, those skilled in the art will appreciate that other priority arrangements are possible within the spirit and scope of the present invention. For example, manual ranking control could be given precedence over manual time of day control, which would have the effect of preserving manual rank settings, but prevent manual time of day control entries from ever appearing at the beginning of the list when at least one manual ranking control entry was also present.

After the manual control entries have been arranged in the top portion of the menu, the remaining menu entries (i.e., those subject to automatic ranking control) are sorted based on their rank rating points {block 1040}. In the unlikely event that more than one entry has the same rank rating, alphabetical order is again used as a secondary ranking factor. Once the menu items have been sorted, current rank field 820 for each entry is updated with the current rank {block 1042} and menu adjuster 255 determines through reference to the load flag whether it was invoked during initialization of WebExplorer 250. If menu adjuster 255 was invoked during initialization of WebExplorer 250, it resets the load flag {block 1037} and returns to control to menu initializer 260 with the highest ranked menu item entry as a return value {block 1039}.

Automatic Font Size Control

Figure 10C:
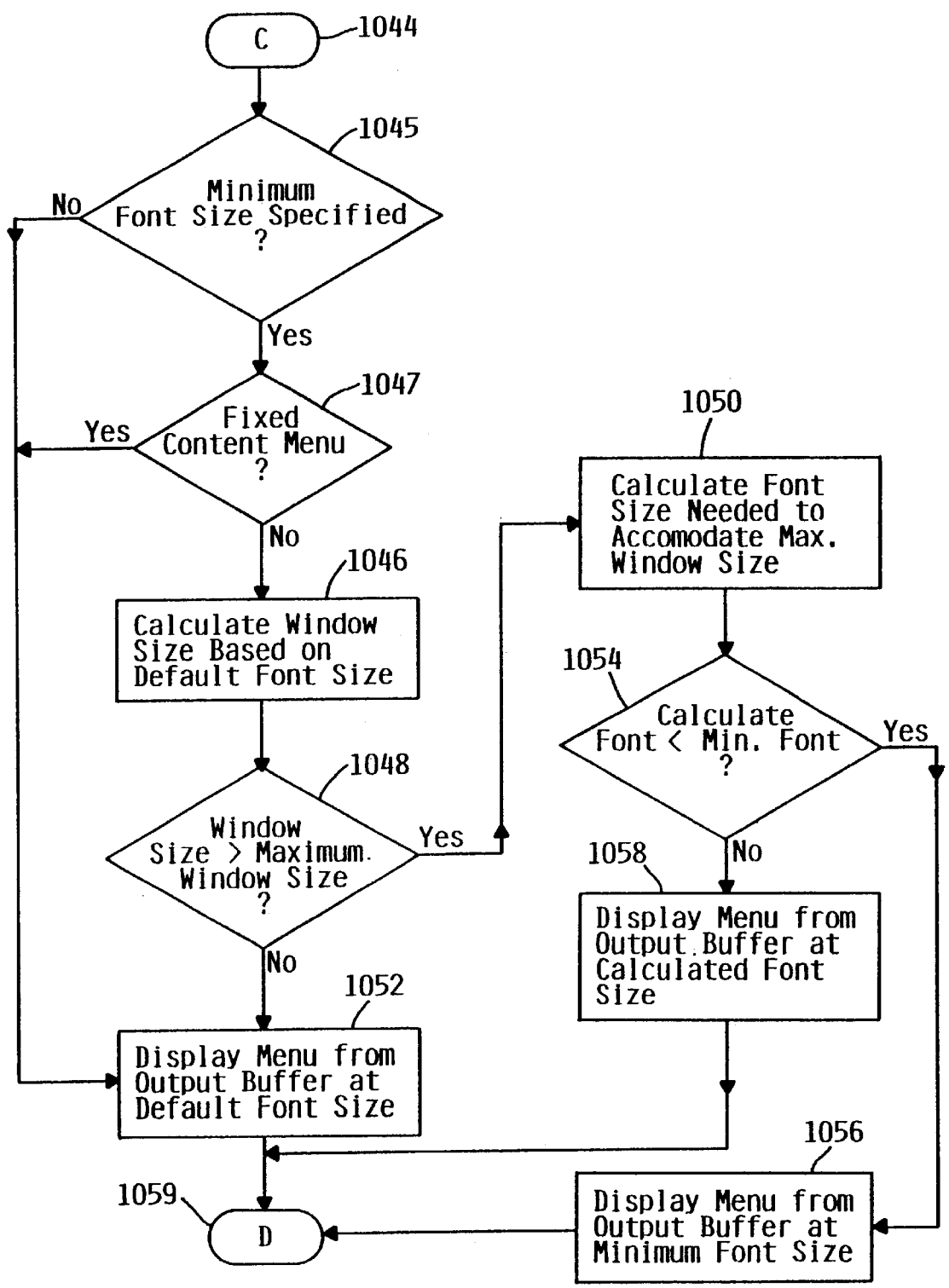

Assume here that the load flag was not set, which will cause menu adjuster 255 to proceed to block 1045 of FIG. 10C (via connector 1044) and determine whether the user has enabled automatic font size control. This determination is accomplished through reference to minimum font size field 615 of user profile 600 (see FIG. 6). If minimum font size control has been enabled, menu adjuster 255 next determines whether the subject menu is a fixed content menu or a variable content menu {block 1046}. This determination is accomplished through reference to FCM/VCM menu flag 705 of menu record 700 (see FIG. 7). If the user has not enabled automatic font size control or if the menu at issue is a fixed content menu, menu adjuster 255 proceeds to block 1052 to display the menu at the default font size.

In the case were the user has enabled automatic font size control and the menu at issue is a variable content menu, menu adjuster 255 proceeds to block 1047 and calculates what size of window (i.e., the window used to display the menu) will be needed to display the menu when considering the content of the menu (i.e., all the menu items that are to be displayed) and the default font size. If the calculated window size is not greater than the maximum permissible window size {block 1048}, the menu is displayed using the default font size {block 1052}. If, however, the calculated window size is greater than the maximum window size, menu adjuster 255 will calculate the font size necessary to allow the content to fit in the menu's window (i.e., based on the maximum window size) {block 1050}. If the calculated font size is less than the minimum font size {block 1054}, the menu is displayed at the minimum font size {block 1056}, and the program (WebExplorer 250 in this case) is left to resolve spill over. If the calculated font size in not smaller than the minimum font size, menu adjuster 255 displays the menu using the calculated font size {block 1058}. It should be noted that the particular way in which the default font size and maximum window size information is made available to menu adjuster 255 is not important to the benefits and advantages of the present invention. It should also be understood that those skilled in the art understand that there is a fixed relationship between font size and window size (i.e., one point equals $\frac{1}{72}$ of an inch). Accordingly, details about these steps are not provided here.

Item Selection/Manual Control Configuration

Figures 2, 10D:
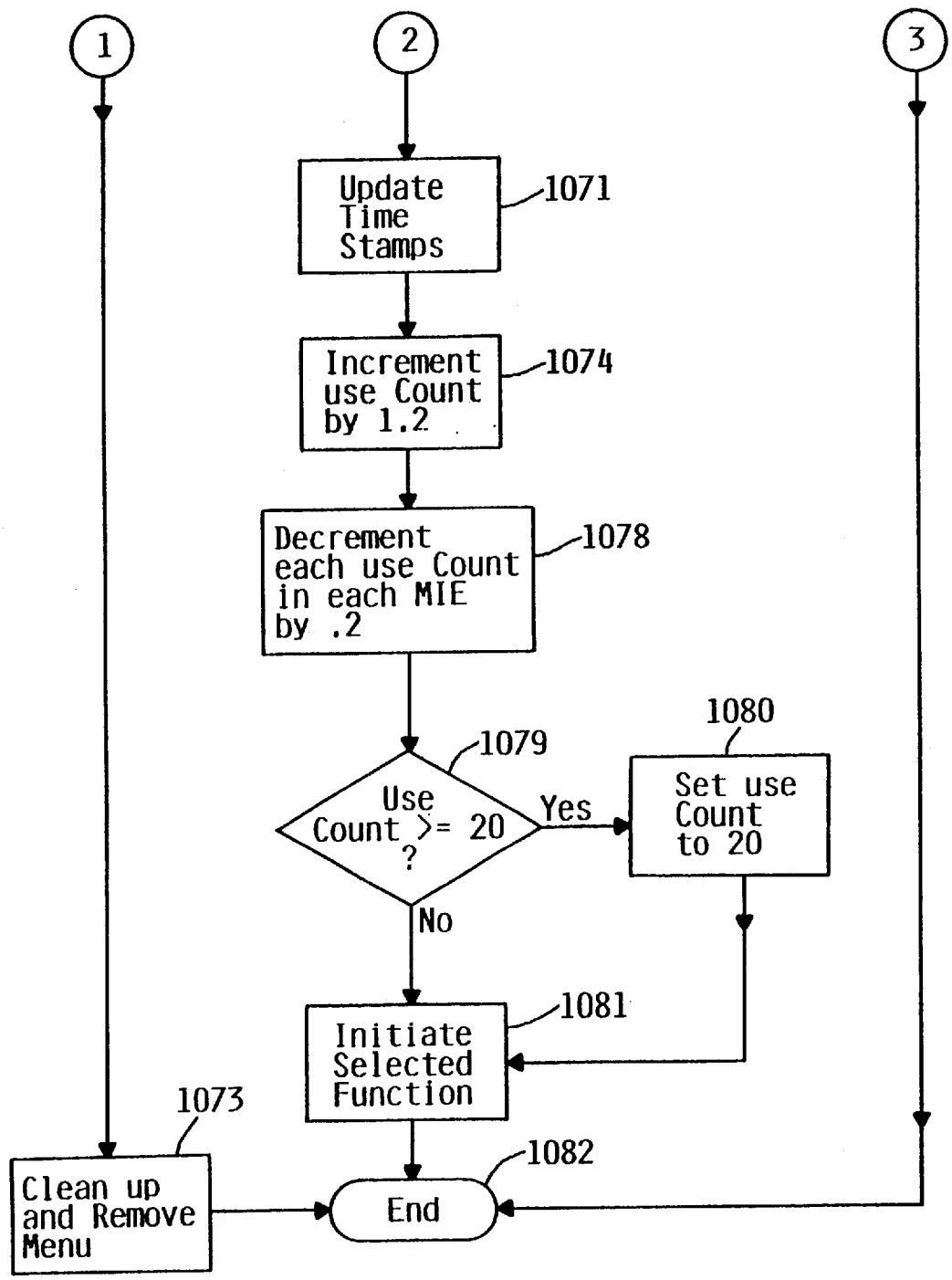

Regardless of the ultimate choice in font size, menu adjuster 255 will proceed (after display of the menu to the user) to block 1060 of FIG. 10D (via connectors 1059) to process the user's selection event. If there is not item text passed to menu adjuster 255 as part of the selection event {block 1061}, menu adjuster 255 knows that user made a selection outside of the window, which causes menu adjuster 255 to proceed to block 1073 where it removes the displayed menu before terminating its processing in block 1082. If the selection event includes item text, menu adjuster 255 retrieves the associated menu item from the menu record {block 1062} and determines whether the selection event is a right mouse button selection event. If so, menu adjuster 255 displays the manual control dialog box in block 1066 and waits for another user selection event in block 1068.

FIGS. 11 and 12 show examples of how manual control dialog box 1100 appears to the user. As shown, dialog box 1100 contains From/To entry area 1105, current rank display 1110, override rank entry area 1115, and the OK and Cancel buttons. From/To entry area 1105 is used to enter a time period during which manual time of day control should take place for the highlighted menu item. This facility is discussed in more detail in the text associated with FIG. 12. As its name suggests, current rank display 1100 shows the user the current rank of the highlighted item. For example, entry 1150 (i.e., the highlighted entry with the item text of "IP & LS") appears nine (9) items from the top of the list, and therefore, has a current rank of nine (9). The rank shown in current rank display 1110 cannot be directly changed by the user. Override rank entry area 1115 is the entry area that the user can use to manually change the position of the highlighted item within the menu. As shown for example purposes, the user has decided that this item should be ranked first in the list and has, accordingly, entered a "1" in override rank entry area 1115. Returning briefly to FIG. 10D, the user's selection of the "OK" button at this point will cause menu adjuster 255 to update manual rank field 825 within the subject menu item entry {block 1078} and terminate its processing in block 1082. Selection of the Cancel button, or receipt of some other event (e.g., a mouse button event that originates from a location outside of the dialog box), causes menu adjuster 255 to proceed to block 1045 of Figure C where the menu is redisplayed to the user.

FIG. 12 shows an example of the use of From/To entry area 1105, which, as mentioned, allows the user to enter a time period during which manual time of day control should take place for the highlighted menu item. Note here that for the purposes of explanation, the user has entered a period of 7 AM to 9 AM during which menu item 1200 (i.e., the highlighted menu item with the item text "Local News Paper") should be displayed at or near the top of the menu. Two points should be noted here. First, we say "at or near" the top of the menu because the mechanisms of the present invention allow the user to place more than one menu entry under manual time of day control, which means that entries that have overlapping time periods will be placed in alphabetical order for menu accesses that occur during the overlap. Second, in the preferred embodiment, the manual ranking control and manual time of day control facilities are not mutually exclusive. While not shown in this particular example, the mechanisms of the present invention do allow the user to enter a range during which the subject item is to be placed at or near that top of the list and enter a manual rank for periods other than the period specified in From/To entry area 1105. As previously described with reference to manual ranking control, the user's selection of the "OK" button at this point will cause menu adjuster 255 to update the subject menu item entry (i.e., its time of day range field 840) {block 1078} and terminate its processing in block 1082. Again, selection of the Cancel button, or receipt of some other event (e.g., a mouse button event that originates from a location outside of the dialog box), causes menu adjuster 255 to proceed to block 1045 of Figure C where the menu is redisplayed to the user.

Returning now to block 1064 of FIG. 10D, a negative determination here (i.e., not a right mouse button selection event) causes menu adjuster 255 to next determine whether the selection event is a left mouse button selection event. If not, menu adjuster 255 proceeds to block 1073 and removes the displayed menu from the user's screen before terminating its processing in block 1082. A left mouse button selection event signals the actual selection (desire for activation) of a particular menu item. Accordingly, menu adjuster 255 updates last selection field 715 and time stamp field 815 with the current date and time {block 1071} and increments the value in use count field 835. In the preferred embodiment, the use count is incremented by a value of one and two tenths (1.2). The additional two tenths (0.2) of a count is used to compensate for a two tenths (0.2) "non-use" decrement in the following processing block. Those skilled in the art will appreciate that other methods are possible within the spirit and scope of the present invention. Then, as mentioned, menu adjuster 255 reduces the use count of each the remaining menu item by two tenths (0.2) {block 1078}. This "non-use" decrement is in place within menu adjuster 255 because without it every menu item's use count would eventually reach the maximum {twenty (20) in the preferred embodiment}, which would have the effect of canceling out any frequency-based menu item arrangement. Once the use counts of the non-selected menu items have been decremented, menu adjuster 255 ensures that the incremented use count does not exceed twenty (20) {blocks 1079 and 1080}, and then proceeds to initiate the selected function via activation information field 810 of the subject menu item entry {block 1081}. Menu adjuster 255 then terminates its processing in block 1082.

FIGS. 13A through 13D are used to illustrate how the automatic and manual control facilities of the preferred embodiment of the present invention interrelate with one another and how the various control values of the preferred embodiment would vary based on a series of fictitious user menu accesses and item selections. While the tables contain information from the menu item entries of the QuickList menu, it should be noted that the tables do not represent any specific data structure, but have instead been created as an explanation aid. As shown on each Figure, each table has 5 columns and 10 rows. The column headings have the following meanings: "Item" is short for the text contained in item text field 805; "R" is short for value in current rank field 820; "UC" is short for the value contained in use count field 835; "LS," which stands for "last selection" is a synthesized version of the information contained in time stamp field 815; and "RR" is short for the value contained in rank rating field 830. Note that the text in the item column has been truncated for space reasons. The reader may refer to FIG. 12 or FIG. 13 to see the full text of the menu items. Note also that the values that are shown in the LS column represent the time of day of the last selection of the particular menu item (in military time) followed by the number calendar days since that last selection. For example, the last selection of menu item 1200 occurred at 12 PM, 8 calendar days before the current day.

Referring now specifically to FIG. 13A, the reader is asked to assume that the current rank ratings represent past activity of the QuickList menu, with the most recent menu item (1315) having been selected at 7:05 AM on the current day. Please further assume that menu item 1200 is subject to manual time of day control (see FIG. 12), that menu item 1150 is subject to manual ranking control (see FIG. 11), and that the user has enabled all three heuristic factors (i.e., recency frequency, and time of day) for automatic ranking control (see FIG. 4B). Note below the calculation of the rank ratings for the 5 menu items that we will track through this explanation.

| Heuristic Factor | Item 1200 | Item 1150 | Item 1315 | Item 1320 | Item 1325 |
|---|---|---|---|---|---|
| Recency Points | 0 | 200 | 400 | 150 | 0 |
| Frequency Points | 40 | 220 | 120 | 340 | 0 |
| T. of Day Points | 0 | 200 | 200 | 0 | 0 |
| Rank Rating | 40 | 620 | 720 | 490 | 0 |

Menu Item 1200—"Local News Paper"

1. Approximately 187 hours have elapsed since this item was last selected, which means that it receives 0 recency points (please refer to the automatic recency control table above).
2. This item has a use count of 2, which means that it receives 40 frequency points.
3. This item was last selected at 12 PM, which means that it receives 0 time of day points (i.e., because its selection did not occur within +/−2 hours from the current time of day).
4. Total=40.
5. This item appears at the top of the list due to its manual time of day control setting.

Menu Item 1150—"IP & LS"

1. Approximately 25 hours have elapsed since this item was last selected, which means that it receives 200 recency points (please refer to the automatic recency control table above).
2. This item has a use count of 11, which means that it receives 220 frequency points.
3. This item was last selected at 6 AM, which means that it receives 200 time of day points (i.e., because its selection occurred within +/−2 hours from the current time of day).
4. Total 620.
5. Appears at rank 2 due to its manual ranking control setting.

Menu Item 1315—"U.S. Patent Database Index Search"

1. Less than ½ hour has elapsed since this item was last selected, which means that it receives 400 recency points (please refer to the automatic recency control table above).
2. This item has a use count of 6, which means that it receives 120 frequency points.
3. This item was last selected at 7 AM, which means that it receives 200 time of day points (i.e., because its selection occurred within +/−2 hours from the current time of day).
4. Total 720.

Menu Item 1320—"IBM Intelligent Agents Home Page"

1. Approximately 68 hours have elapsed since this item was last selected, which means that it receives 150 recency points (please refer to the automatic recency control table above).

2. This item has a use count of 17, which means that it receives 340 frequency points.
3. This item was last selected at 12 PM, which means that it receives 0 time of day points (i.e., because its selection did not occur within +/−2 hours from the current time of day).
4. Total=490.

Menu Item 1325—"Software Patent Institute"

1. Approximately 237 hours have elapsed since this item was last selected, which means that it receives 0 recency points (please refer to the automatic recency control table above).
2. This item has a use count of 0, which means that it receives 0 frequency points.
3. This item was last selected at 10 AM, which means that it receives 0 time of day points (i.e., because its selection did not occur within +/−2 hours from the current time of day).
4. Total=0.

Assume that during the 7:15 AM menu access the user selects menu item 1325. Then, at 7:30 AM, the user accesses the QuickList menu again. FIG. 13B reflects the state of the table. Note that menu item 1325 has moved from a rank of 10th to a rank of 4th, due primarily to its recent selection (recency) and to the fact that the selection occurred within +/−2 hours of the current time. Note the table below and the associated explanation.

| Heuristic Factor | Item 1200 | Item 1150 | Item 1315 | Item 1320 | Item 1325 |
|---|---|---|---|---|---|
| Recency Points | 0 | 200 | 400 | 150 | 400 |
| Frequency Points | 36 | 216 | 116 | 336 | 20 |
| T. of Day Points | 0 | 200 | 200 | 0 | 200 |
| Rank Rating | 36 | 616 | 716 | 486 | 620 |

Menu Item 1200—"Local News Paper"

1. This item's total changes only due to a frequency count deduction of 4 points.
   See block 1078 of FIG. 10D and the associated text.
2. Total=36.

Menu Item 1150—"IP & LS"

1. This item's total changes only due to a frequency count deduction of 4 points.
   See block 1078 of FIG. 10D and the associated text.
2. Total=616.

Menu Item 1315—"U.S. Patent Database Index Search"
1. This item's total changes only due to a frequency count deduction of 4 points.
   See block 1078 of FIG. 10D and the associated text.
2. Total=716.

Menu Item 1320—"IBM Intelligent Agents Home Page"

1. This item's total changes only due to a frequency count deduction of 4 points.
   See block 1078 of FIG. 10D and the associated text.
2. Total=486.

Menu Item 1325—"Software Patent Institute"

1. Less than ½ hour has elapsed since this menu item was selected, which means that it receives 400 recency points (please refer to the automatic recency control table above).
2. This item now has a use count of 1, which means that it receives 20 frequency points.
3. This item was last selected at 7:15 AM, which means that it receives 200 time of day points (i.e., because its selection occurred within +/−2 hours from the current time of day).
4. Total=620.

Assume that during the 7:30 AM menu access the user selects menu item 1320. Then, at 8:45 AM, the user accesses the QuickList menu again. FIG. 13C reflects the state of the table. Note that menu item 1320 has moved from a rank of 7th to a rank of 3rd, due primarily to an increase in its recency points and to the fact that the selection occurred within +/−2 hours of the current time. Note the table below and the associated explanation.

| Heuristic Factor | Item 1200 | Item 1150 | Item 1315 | Item 1320 | Item 1325 |
|---|---|---|---|---|---|
| Recency Points | 0 | 200 | 400 | 400 | 400 |
| Frequency Points | 32 | 212 | 112 | 356 | 16 |
| T. of Day Points | 0 | 0 | 200 | 200 | 200 |
| Rank Rating | 32 | 412 | 712 | 956 | 616 |

Menu Item 1200—"Local News Paper"

1. This item's total changes only due to a frequency count deduction of 4 points.
   See block 1078 of FIG. 10D and the associated text.
2. Total=32.

Menu Item 1150—"IP & LS"

1. This item loses 4 points due to the frequency count deduction. See block 1078 of FIG. 10D and the associated text.
2. This item also loses 200 points due to the fact that its last selection occurred at a time of day that was more than +/−2 hours from the current time of day.
3. Total=412.

Menu Item 1315—"U.S. Patent Database Index Search"

1. This item's total changes only due to a frequency count deduction of 4 points.
   See block 1078 of FIG. 10D and the associated text.
2. Total=712.

Menu Item 1320—"IBM Intelligent Agents Home Page"

1. This item receives 400 recency points because it was selected within ½ hour of the last menu item selected (i.e., because it was the last menu item selected)
2. This item receives an increased number of frequency points because of its selection.
3. This item receives 200 time of day points because the time of day of its last selection was within +/−2 hours of the current time of day.

4. Total=956.

Menu Item 1325—"Software Patent Institute"

1. This item's total changes only due to a frequency count deduction of 4 points.
   See block 1078 of FIG. 10D and the associated text.
2. Total=616.

Assume that the user does not make a selection during the 8:45 AM menu access. Then, at 9:15 AM, the user accesses the QuickList menu again. FIG. 13D reflects the state of the table. Note that menu item 1200 has moved from a rank of 1st to a rank of 10th, due to the fact that it manual time of day control setting expired (see FIG. 12). Note the table below and the associated explanation.

| Heuristic Factor | Item 1200 | Item 1150 | Item 1315 | Item 1320 | Item 1325 |
|---|---|---|---|---|---|
| Recency Points | 0 | 200 | 400 | 400 | 400 |
| Frequency Points | 32 | 212 | 112 | 360 | 20 |
| T. of Day Points | 0 | 0 | 0 | 200 | 200 |
| Rank Rating | 32 | 412 | 512 | 960 | 620 |

Menu Item 1200—"Local News Paper"

No change.

Menu Item 1150—"IP & LS"

No change.

Menu Item 1315—"U.S. Patent Database Index Search"

1. This item loses the 200 time of day points because the time of day that it was last accessed is more than +/−2 hours from the current time of day.
2. Total=512.

Menu Item 1320—"IBM Intelligent Agents Home Page"

No change.

Menu Item 1325—"Software Patent Institute"

No change.

Profile Feedback—Client

FIG. 14A is a diagram that shows the steps used in the preferred embodiment to carry out the processing of profile feedback mechanism 265. As mentioned earlier, profile feedback mechanism 265 is scheduled to execute periodically by menu initializer 260. As its name suggests, its purpose is to provide feedback about the menu selection patterns of its user so that this information can be incorporated into master profiles on server 300. In block 1400, profile feedback mechanism 265 begins to execute per its scheduling. In block 1405, profile feedback mechanism 265 retrieves the menu records for fixed content menus from the user profile. Profile feedback mechanism 265 then creates a profile update message {block 1410} and sends the message to the server {block 1415} before terminating its processing in block 1420.

Figure 14B:
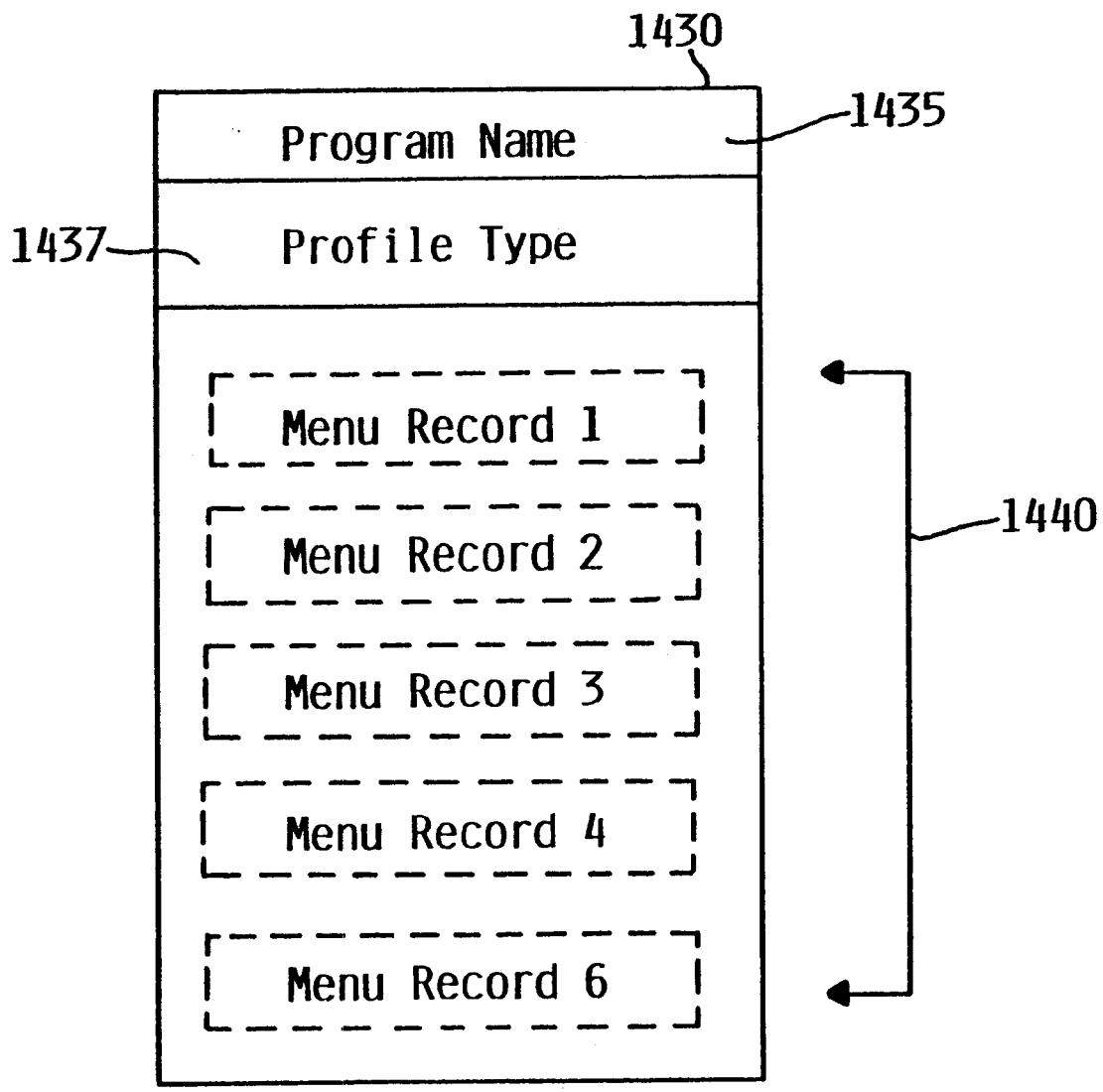
FIG. 14B is a block diagram of the profile feedback message of the preferred embodiment.

FIG. 14B shows the format of the profile update message of the preferred embodiment. As shown, profile update message 1430 contains program name field 1435, profile type field 1437, and a series of menu records 1440. In our example, program name field 1435 will contain an identifier for WebExplorer 250, profile type field 1437 will contain the "Engineer" identifier (see FIG. 4B), and menu records 1440 will be the menu records for each of the fixed content menus of WebExplorer 250 (i.e., all of the menu records except the QuickList menu record, which, as discussed, is a variable content menu).

Profile Management—Server

FIG. 15A is a diagram that shows the steps used in the preferred embodiment to carry out the processing of profile management mechanism 355 of the preferred embodiment. Profile management mechanism 355, which is started as part of the normal initialization of server 300, waits for messages from its clients in block 1505. When a message is received, profile management mechanism 355 determines whether the message is a profile request message (i.e., as sent by a menu initializer) or a profile feedback mechanism (i.e., as sent by a profile feedback mechanism) {block 1510}. If the message is a profile request message, profile management mechanism 355 retrieves the specified master profile (i.e., as specified in the request message) {block 1515}, and sends a copy of the master profile to the client {block 1525} before returning to block 1505 to await further messages. Please refer to the text associated with FIG. 4A for details on how the master profile is received and handled by the client.

If, in block 1510, profile management mechanism 355 determines that the message is a profile feedback message, profile management mechanism 355 updates the menu preference records to reflect the received information {block 1520}, and updates the appropriate master profile (if necessary) {block 1530} before returning to block 1505 to await further messages from its clients.

Figure 15B:
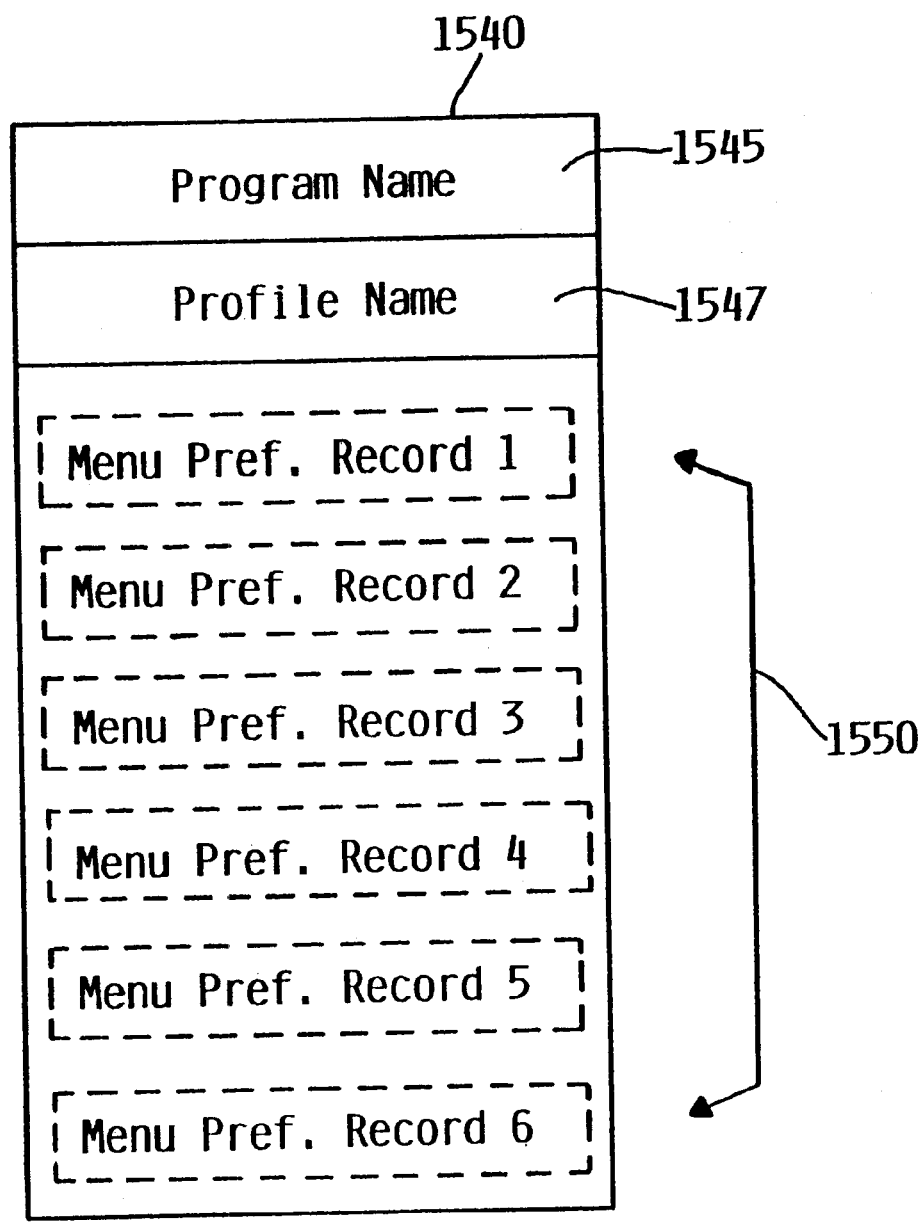
FIG. 15B is a block diagram that shows the program preference profile of the preferred embodiment.

Each program being serviced by the menu management mechanisms of the preferred embodiment (e.g., WebExplorer 250) has associated with it (on server 300) a series of program preference profiles (i.e., one for each profile type {e.g., "Engineer"}). Each of these program preference profiles is stored in program preference repository 360. FIG. 15B shows the format of the program preference profile of the preferred embodiment. As shown, program preference profile 1540 contains program name field 1545, profile name field 1547, and a series of menu preference records 1550. The program name field contains the name of the program at issue (here WebExplorer) and the profile name field contains information about the profile type (here "Engineer").

Figure 15C:
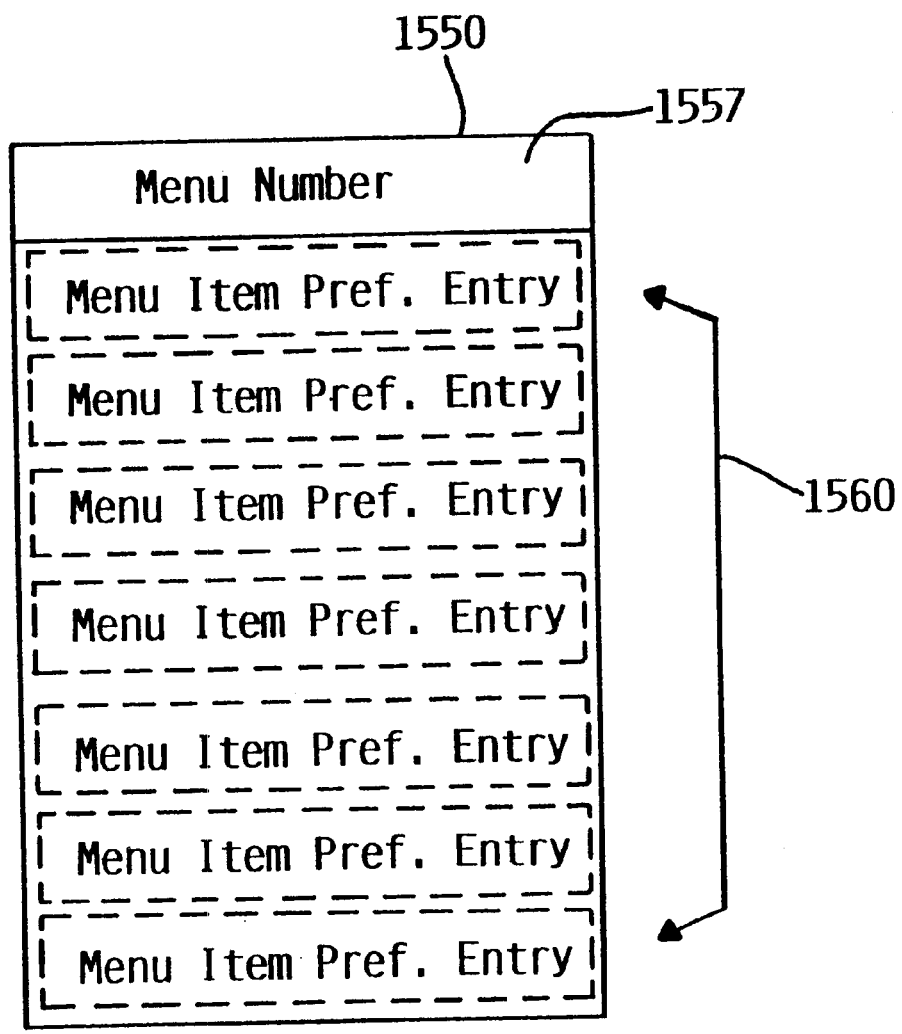
FIG. 15C is a block diagram that shows the menu preference record of the preferred embodiment.

FIG. 15C shows the format of the menu preference record of the preferred embodiment. As shown, each menu preference record contains menu number 1557, which, it should be noted, corresponds to a menu number within the master profile (see FIG. 5), and a series of menu item preference entries 1560.

Figure 15D:
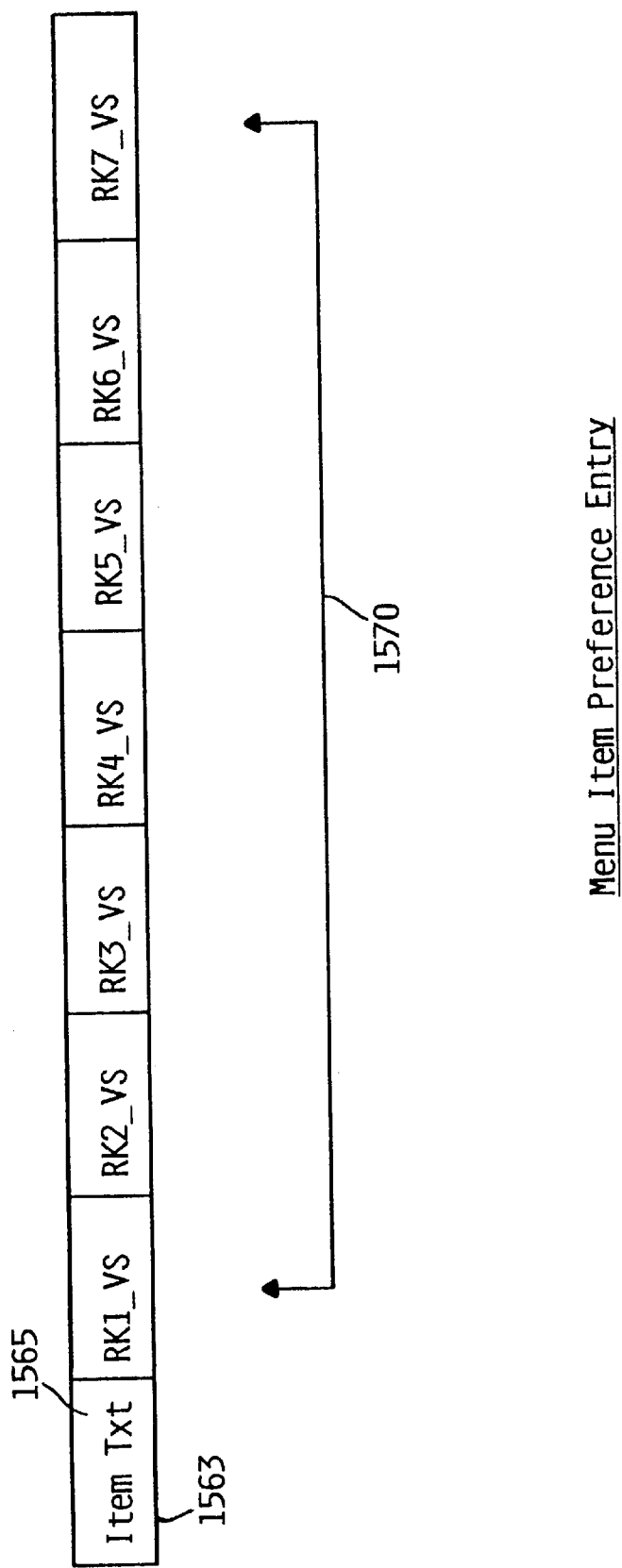
FIG. 15D is a block diagram that shows the menu item preference entry of the preferred embodiment.

FIG. 15D shows menu item preference entry structure 1563, which is the structure used for menu item preference entries 1560 of FIG. 15B. As shown, each menu item preference entry contains menu item text field 1565 and a series of rank votes fields 1570. Each time a profile feedback message is received, profile management mechanism 355 increments the rank vote value for each menu item from each menu record to reflect the rank that each item appears in its respective menu (see block 1520 of FIG. 15A). For example, the Configure menu, as shown on FIG. 3, has the "Menus . . . " item ranked 7th. A profile feedback message that was initiated at a time when the "Menus . . . " item was so ranked would cause profile management mechanism 355 to increment the RNK7#—VS field of the menu preference entry associated with the "Menus . . ." item by one.

Once all of the menu preference entries have been updated to reflect the information contained in a profile update message, profile management mechanism 355 will next rearrange the menu items within the associated master profile (i.e., the one of the type specified in the profile update message), if necessary (see block 1530 of FIG. 15A). This rearrangement is based on the number of rank votes each menu item has for each rank within a menu, with the menu item with the most votes for a given rank being placed at that rank. Ties are handled based on alphabetical order, with the losing menu item being placed at some other rank based on it having the highest vote total for that other rank. It should also be understood that the rank vote fields are large enough (in the preferred embodiment) to handle 10,000 votes. When a rank vote field is incremented by profile management mechanism 355 such that it will exceed 10,000 votes, all of the rank votes are normalized as low as possible while still retaining the absolute vote differences of the values. For example, if a menu had three items, one that had a rank vote that was about to exceed 10,000, one item that had a rank vote value of 6000, and one item that had a rank vote of 2000, the rank vote value of 2000 would be set to 0, with the other two being dropped by 2000 such that the highest rank vote value was 8000 and the next highest rank vote was 4000. This normalization logic is not shown.

Advantages

A first advantage of the present invention is that it provides automatic arrangement of menu items based on more than one heuristic factor.

A second advantage of the present invention is that it provides automatic recency control for fixed content menus.

A third advantage of the present invention is that is provides automatic frequency control for variable content menus.

A fourth advantage of the present invention is that it provides time of day control for menu management.

A fifth advantage of the present invention is that it provides the user with the ability to order menu items by manually ranking menu items and by specifying periods of the day at which certain menu items should appear at or near the top of a menu.

A sixth advantage of the present invention is that it provides the user with the ability to specify a minimum font size for variable content menus, thereby maximizing the amount of content that can appear and be seen by the user.

A seventh advantage of the present invention is the provision for feedback-based menu initialization that allows initialization of menus based on user type.

An eighth advantage of the present invention is that it allows a web browser user to choose to have their web browser automatically load a selected home-base web page after initialization or to have the web browser automatically load the web page that appears at the top of a URL list.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer system comprising:

a processor;

memory connected to said processor;

a web browser stored in said memory for execution on said processor, said web browser being used to present an initial web page to a user and then to present one or more subsequent web pages to said user, said web browser automatically selecting said initial web page from a plurality of web pages during initialization of said web browser and automatically presenting said initial web page to said user after said web browser has completed initializing, said plurality of web pages including historical web page selections by said user, said initial web page being determined via ranking control, said ranking control being selected from the group consisting of:

automatic ranking control; and manual ranking control.

2. The computer system of claim 1 wherein said plurality of web pages make up an ordered list of web pages.

3. A program product, said program product comprising:

signal bearing media; and a web browser recorded on said signal bearing media, said web browser automatically presenting a user with a web page after said web browser has completed initializing, said web page being selected from a plurality of web pages, wherein said plurality of web pages includes historical web page selections by said user, said web page being selected based upon ranking control, said ranking control being selected from the group consisting of:

automatic ranking control; and manual ranking control.

4. The program product of claim 3 wherein said plurality of web pages make up an ordered list of web pages.

5. A computer-implemented method within a web browser for presenting an initial web page and one or more subsequent web pages to a user, said method comprising the steps of:

automatically selecting said initial web page from a plurality of web pages; and automatically presenting said initial web page to said user after said web browser initializes, said plurality of web pages including historical web page selections by said user, said initial web page being selected based upon ranking control, said ranking control being selected from the group consisting of:

automatic ranking control; and manual ranking control.

6. The method of claim 5 wherein said plurality of web pages make up an ordered list of web pages.

7. A computer system comprising:

a processor;

memory connected to said processor;

a web browser stored in said memory for execution on said processor; and a menu for presentation by said program, said menu having a Uniform Resource Locator (URL) list containing a plurality of URLs, at least some URLs in said list being arranged based at least in part upon time of day.

8. The computer system of claim 7, wherein at least one of said plurality of URLs is manually arranged in said URL list by a user of the computer system such that said at least one of said plurality of URLs has a specified position within said URL list.

9. The computer system of claim 8, wherein said at least one of said plurality of URLs is manually arranged in said URL list, and wherein said at least one of said plurality of URLs remains at said specified position for a period of time.

10. The computer system of claim 9, wherein said at least one of said plurality of URLs is manually arranged in said URL list based at least in part on the desired position of said at least one of said plurality of URLs within said URL list.

11. A program product comprising:
 a web browser, said web browser being capable of presenting a URL list, said menu having at least some URLs arranged based at least in part upon time of day;
 and signal bearing media bearing said program.

12. A computer-implemented method, said method comprising the steps of:
 receiving a request from a user to present a Uniform Resource Locator (URL) list, said URL list containing a plurality of URLs;
 arranging at least some of said URLs based at least in part upon time of day; and
 presenting said URL list to said user.

13. The computer-implemented method of claim 12, wherein at least one of said plurality of URLs is manually arranged in said URL list by said user such that said at least one of said plurality of URLs has a specified position within said URL list.

14. The computer-implemented method of claim 13, wherein said at least one of said plurality of URLs is manually arranged in said URL list, and wherein said at least one of said plurality of URLs remains at said specified position for a period of time.

15. The computer-implemented method of claim 14, wherein said at least one of said plurality of URLs is manually arranged in said URL list based at least in part on the desired position of said at least one of said plurality of URLs within said URL list.

16. The program product of claim 11, wherein at least one of said plurality of URLs is manually arranged in said URL list by a user of the computer system such that said at least one of said plurality of URLs has a specified position within said URL list.

17. The program product of claim 16, wherein said at least one of said plurality of URLs is manually arranged in said URL list, and wherein said at least one of said plurality of URLs remains at said specified position for a period of time based at least in part on the time of day.

* * * * *